(12) United States Patent
Shao et al.

(10) Patent No.: US 11,006,438 B2
(45) Date of Patent: May 11, 2021

(54) SIGNAL TRANSMISSION METHOD, RELATED APPARATUS, AND SYSTEM

(71) Applicant: Huawei Technologies Co., Ltd., Shenzhen (CN)

(72) Inventors: Jiafeng Shao, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/731,737

(22) Filed: Dec. 31, 2019

(65) Prior Publication Data

US 2020/0137781 A1 Apr. 30, 2020

Related U.S. Application Data

(63) Continuation of application No. PCT/CN2017/101146, filed on Sep. 8, 2017.

(51) Int. Cl.
*H04W 72/12* (2009.01)
*H04W 72/04* (2009.01)
(Continued)

(52) U.S. Cl.
CPC ....... *H04W 72/1268* (2013.01); *H04L 1/0026* (2013.01); *H04L 1/1819* (2013.01); *H04L 5/0046* (2013.01); *H04W 72/0413* (2013.01)

(58) Field of Classification Search
CPC .......... H04W 72/1268; H04W 72/0413; H04L 1/0026; H04L 1/1819; H04L 5/0046
See application file for complete search history.

(56) References Cited

U.S. PATENT DOCUMENTS 9,439,178 B2 * 9/2016 Suzuki ................. H04L 1/1607
9,509,475 B2 * 11/2016 Kim ..................... H04J 11/0093
(Continued)

FOREIGN PATENT DOCUMENTS

CN 103095398 A 5/2013
CN 103313368 A 9/2013
(Continued)

OTHER PUBLICATIONS

"Reusing PUCCH format 3 to multiplex CSI reports for DL CoMP," 3GPP TSG-RAN WG1 #70bis, San Diego, USA, R1-124350, pp. 1-5, 3rd Generation Partnership Project, Valbonne, France (Oct. 8-12, 2012).

(Continued)

*Primary Examiner* — Rasheed Gidado
(74) *Attorney, Agent, or Firm* — Leydig, Voit & Mayer, Ltd.

(57) ABSTRACT

This application discloses a signal transmission method. The method may include: generating, by a terminal, a first bit(s), where the first bit(s) is used to indicate scheduling requests associated with a first scheduling request configuration, and the first scheduling request configuration is at least one of a plurality of scheduling request configurations; generating, by the terminal, a hybrid automatic repeat request bit(s); and sending, by the terminal, the hybrid automatic repeat request bit(s) and the first bit(s) in one time unit. In the foregoing solution, a plurality of scheduling request configurations can be supported, so as to adapt to a multi-service scenario in a future communications system.

12 Claims, 12 Drawing Sheets

(51) Int. Cl.
*H04L 1/18* (2006.01)
*H04L 5/00* (2006.01)
*H04L 1/00* (2006.01)

(56) References Cited

U.S. PATENT DOCUMENTS

| | | | |
|---|---|---|---|
| 9,756,620 B2* | 9/2017 | Yang | H04L 5/00 |
| 10,568,124 B2* | 2/2020 | Park | H04L 1/1812 |
| 2010/0226326 A1* | 9/2010 | Ahn | H04W 72/1278 |
| | | | 370/329 |
| 2011/0055653 A1 | 3/2011 | Shirani-Mehr et al. | |
| 2011/0274062 A1* | 11/2011 | Cheng | H04L 5/0053 |
| | | | 370/329 |
| 2012/0084618 A1* | 4/2012 | Choudhury | H03M 13/136 |
| | | | 714/752 |
| 2012/0113967 A1* | 5/2012 | Smith | H04L 27/2613 |
| | | | 370/338 |
| 2013/0121258 A1* | 5/2013 | Mukherjee | H04W 74/004 |
| | | | 370/329 |
| 2014/0003452 A1* | 1/2014 | Han | H04W 72/1268 |
| | | | 370/474 |
| 2014/0036664 A1 | 2/2014 | Han et al. | |
| 2014/0036856 A1 | 2/2014 | Park | |
| 2016/0105905 A1 | 4/2016 | Vajapeyam et al. | |
| 2016/0119940 A1* | 4/2016 | Wang | H04L 1/1861 |
| | | | 370/329 |
| 2016/0262182 A1 | 9/2016 | Yang et al. | |
| 2016/0345352 A1* | 11/2016 | Langereis | H04B 1/40 |
| 2017/0026958 A1 | 1/2017 | Noh et al. | |
| 2017/0099661 A1 | 4/2017 | Englund et al. | |
| 2017/0111897 A1 | 4/2017 | Kim et al. | |
| 2018/0192414 A1 | 7/2018 | Takahashi et al. | |
| 2019/0036667 A1* | 1/2019 | Wang | H04L 5/0055 |

FOREIGN PATENT DOCUMENTS

| | | |
|---|---|---|
| CN | 104170491 A | 11/2014 |
| CN | 104170493 A | 11/2014 |
| CN | 106793105 A | 5/2017 |
| CN | 106797646 A | 5/2017 |
| CN | 107736050 A | 2/2018 |
| CN | 109067512 B | 9/2019 |
| CN | 110431905 A | 11/2019 |
| RU | 2494576 C2 | 9/2013 |
| RU | 2569319 C2 | 11/2015 |
| WO | 2017120183 A1 | 7/2017 |
| WO | 2017146751 A1 | 8/2017 |
| WO | 2019047193 A1 | 3/2019 |

OTHER PUBLICATIONS

"PUCCH resource allocation for HARQ-ACK and SR," 3GPP TSG RAN WG1 Meeting #89, Hangzhou, China, R1-1706960, pp. 1-4, 3rd Generation Partnership Project, Valbonne, France (May 15-19, 2017).

"3rd Generation Partnership Project; Technical Specification Group Radio Access Network; NR; Multiplexing and channel coding (Release 15)," 3GPP TS 38.212 V1.0.0, pp. 1-28, 3rd Generation Partnership Project, Valbonne, France (Sep. 2017).

"3rd Generation Partnership Project; Technical Specification Group Radio Access Network; NR; Physical layer procedures for control (Release 15)," 3GPP TS 38.213 V1.0.0, pp. 1-16, 3rd Generation Partnership Project, Valbonne, France (Sep. 2017).

"3rd Generation Partnership Project; Technical Specification Group Radio Access Network; NR; Radio Resource Control (RRC); Protocol specification (Release 15)," 3GPP TS 38.331 V0.0.5, pp. 1-38, 3rd Generation Partnership Project, Valbonne, France (Aug. 2017).

Tesanovic, "LS on SR design principles in NR," 3GPP TSG-RAN WG1 Meeting #AH_NR2, Qingdao, P.R. China, R1-1710211, one page, 3rd Generation Partnership Project, Valbonne, France (Jun. 27-30, 2017).

"Discussion on SR and BSR enhancements," 3GPP TSG-RAN2 Meeting #98, Hangzhou, China, R2-1704054, pp. 1-3, 3rd Generation Partnership Project, Valbonne, France (May 15-19, 2017).

"Resource allocation for PUCCH with SR," 3GPP TSG RAN WG1 Meeting #89, Hangzhou, China, R1-1708011, pp. 1-4, 3rd Generation Partnership Project, Valbonne, France (May 15-19, 2017).

"On the remaining details of short PUCCH for UCI up to 2 bits," 3GPP TSG RAN WG1 #90, Prague, Czech Republic, R1-1714072, XP051316862, Total 4 pages, 3rd Generation Partnership Project, Valbonne, France (Aug. 21-25, 2017).

* cited by examiner

Wireless communications system 10

SIGNAL TRANSMISSION METHOD, RELATED APPARATUS, AND SYSTEM

CROSS-REFERENCE TO RELATED APPLICATIONS

This application is a continuation of International Application No. PCT/CN2017/101146, filed on Sep. 8, 2017, the disclosure of which is hereby incorporated by reference in its entirety.

TECHNICAL FIELD

Embodiments of this application relate to the field of wireless communications technologies, and in particular, to a signal transmission method, a related apparatus, and a system.

BACKGROUND

In a Long Term Evolution Advanced (LTE-A) system, as shown in FIG. 1, a process from a time when a terminal device has no to-be-scheduled resource to a time when the terminal device sends an uplink channel may include: UE waits a time for sending a scheduling request (SR), and sends the SR; an enhanced NodeB (eNB) receives the SR and generates a scheduling grant, and sends the scheduling grant; the UE receives the scheduling grant and sends an uplink channel; and if a data volume of the UE is not completely sent, the UE further needs to wait for a next scheduling grant.

In the LTE-A system, as shown in FIG. 2, if a hybrid automatic repeat request (HARQ) subframe in physical uplink control channel (PUCCH) format 3/PUCCH format 4/PUCCH format 5 used by the terminal device and an SR subframe configured by a higher layer for the terminal are a same subframe, there is one scheduling request bit. Otherwise, if they are not a same subframe, there are zero scheduling request bit. The one scheduling request bit is added after consecutive HARQ bits. Specifically, when a bit state of the bit is 1, it indicates a positive scheduling request (positive SR), and the positive scheduling request indicates that there is currently uplink data for the terminal, or a network device currently needs to allocate a resource used for transmission to the terminal. When the bit state of the bit is 0, it indicates a negative scheduling request (negative SR), and the negative scheduling request indicates that there is currently no uplink data for the terminal, or there is currently no need to allocate a resource used for transmission to the terminal.

In a fifth-generation mobile radio technology (NR) system, there are a plurality of service types, and the plurality of service types correspond to different service requirements. For example, ultra-reliable low-latency communication (uRLLC) requires a short latency and high reliability, and, to be specific, a successful transmission within 1 ms; enhanced mobile broadband (eMBB) requires high spectral efficiency but has no latency requirement; and massive Machine Type Communication (mMTC) requires periodic sending at low power. For different services, the terminal device needs to request for resources of different attributes (Numerology/Transmission Time Interval (TTI)), to satisfy service requirements of the different services.

However, the one scheduling request bit in LTE-A does not support a multi-service scenario in future 5G, and this problem needs to be urgently resolved currently.

SUMMARY

This application provides a signal transmission method, a related apparatus, and a system, so that a plurality of scheduling request configurations can be supported, thereby adapting to a multi-service scenario in a future communications system.

According to a first aspect, this application provides a signal transmission method, which is applied to a terminal device side. The method includes: generating, by a terminal device, a first bit(s) and a hybrid automatic repeat request bit(s); and sending the hybrid automatic repeat request bit(s) and the first bit(s) in one time unit, where the first bit(s) is used to indicate a scheduling request(s) associated with a first scheduling request configuration(s), and the first scheduling request configuration(s) is at least one of a plurality of scheduling request configurations.

According to a second aspect, this application provides a signal transmission method, which is applied to a network device side. The method includes: receiving, by a network device, a hybrid automatic repeat request bit(s) and a first bit(s) from a terminal device in one time unit; and determining, based on the first bit(s), a scheduling request(s) associated with a first scheduling request configuration(s), where the first bit(s) is used to indicate the scheduling request(s) associated with the first scheduling request configuration(s), and the first scheduling request configuration(s) is at least one of a plurality of scheduling request configurations.

A plurality of scheduling request configurations can be supported by implementing the methods described in the first aspect and the second aspect, so as to adapt to a multi-service scenario in a future communications system.

In the methods described in the first aspect and the second aspect, the first bit(s) is an SR bit(s). A scheduling request configuration is referred to as an SR configuration (namely, SR configuration) for short below.

With reference to the first aspect or the second aspect, the following first describes several manners of defining a quantity of the plurality of SR configurations.

(1) In manner 1, the quantity of the plurality of SR configurations is equal to a quantity of all SR configurations. To be specific, the plurality of SR configurations may be all SR configurations dynamically configured by the network device for the terminal, or may be all SR configurations configured by the network device for the terminal by using higher layer signaling, or may be all SR configurations configured by another terminal device for the terminal.

In manner 1, efficiency in reporting, by the terminal device, SRs associated with all the SR configurations can be improved.

(2) In manner 2, the quantity of the plurality of SR configurations is equal to a quantity of SR configurations in the time unit. To be specific, the plurality of SR configurations may be SR configurations in the time unit that are dynamically configured by the network device for the terminal, or may be SR configurations in the time unit that are configured by the network device for the terminal by using higher layer signaling, or may be SR configurations in the time unit that are configured by another terminal for the terminal.

In manner 2, only SRs associated with SR configurations actually configured for the terminal in the time unit are reported, so as to reduce SR bit overheads.

(3) In manner 3, the quantity of the plurality of SR configurations is equal to a quantity of SR configurations in a plurality of time units. To be specific, the plurality of SR configurations may be SR configurations that are dynamically configured by the network device for the terminal and that are in a plurality of time units, or may be SR configurations that are configured by the network device for the terminal by using higher layer signaling and that are in a plurality of time units, or may be SR configurations that are configured by another terminal for the terminal and that are in a plurality of time units. The plurality of time units include one time unit in which the terminal sends the hybrid automatic repeat request bit(s) and the first bit(s).

In manner 3, only SRs associated with SR configurations that are actually configured for the terminal and that are in a plurality of time units are reported, so as to reduce SR bit overheads.

(4) In manner 4, the quantity of the plurality of SR configurations is equal to a quantity of SR configurations that are associated with a same uplink control channel attribute and that are in one or more time units. To be specific, the plurality of SR configurations may be SR configurations that are dynamically configured by the network device for the terminal and that are in one or more time units and associated with a same uplink control channel attribute, or may be SR configurations that are configured by the network device for the terminal by using higher layer signaling and that are in one or more time units and associated with a same uplink control channel attribute, or may be SR configurations that are configured by another terminal for the terminal and that are in one or more time units and associated with a same uplink control channel attribute.

In manner 4, SR configurations associated with different uplink control channel attributes can be reported distinctively, with higher flexibility. SR configurations are reported for different uplink control channel attributes, so as to reduce SR bit overheads.

With reference to the first aspect or the second aspect, the following describes SR bit design solutions provided in this application.

Solution 1: One bit in the SR bit(s) (namely, the first bit(s)) is used to indicate a scheduling request associated with one SR configuration in the at least one SR configuration (namely, first SR configuration(s)). It may be understood that a first SR configuration(s) corresponds to a bit in the SR bit(s). Specifically, one SR configuration corresponds to one bit in the SR bit(s). In this case, a quantity $O^{SR}$ of the SR bits is equal to a quantity of the plurality of SR configurations (namely, the plurality of SR configurations mentioned in the foregoing invention principles) configured for the terminal. This is a manner in which the quantity $O^{SR}$ of the SR bits is related to the quantity of the plurality of SR configurations.

Specifically, a correspondence between an SR configuration and a bit in the SR bit(s) may be dynamically configured by the network device, or may be configured by the network device by using higher layer signaling. The correspondence may include B SR configuration(s), and B bit(s) respectively corresponding to the B SR configuration(s). In this way, the terminal device may determine, based on the correspondence, each bit corresponding to each SR configuration of the at least one SR configuration (namely, first SR configuration(s)) in the SR bits. Herein, B is a positive integer. In this application, the correspondence configured by the network device or configured by using higher layer signaling may be referred to as a first correspondence.

This application is not limited to that one SR configuration corresponds to one bit in the SR bit(s). In solution 1, one SR configuration may alternatively correspond to a plurality of bits in the SR bits. In other words, a plurality of bits may be used to indicate an SR associated with one SR configuration. In this case, the quantity $O^{SR}$ of the SR bits is equal to an integer multiple of the quantity of the SR configurations (namely, the plurality of SR configurations mentioned in the foregoing invention principles) configured by the network device for the terminal. This is another manner in which the quantity $O^{SR}$ of the SR bit(s) is related to the quantity of the SR configuration(s) configured by the network device for the terminal.

Technical effects of solution 1 are as follows: A plurality of SRs can be reported, and a plurality of SRs associated with different SR configurations can be flexibly implemented.

Solution 2: A bit state of an SR bit(s) (namely, a first bit(s)) is used to indicate a scheduling request(s) associated with the at least one SR configuration (namely, first SR configuration(s)). The SR(s) (positive SR or negative SR) associated with the first SR configuration(s) corresponds to the state(s) of the SR bit(s).

Optionally, a first state of the SR bit(s) is used to indicate that the SR(s) associated with the first SR configuration(s) is a negative SR(s). Optionally, at least one state of the SR bit(s) other than the first state is used to indicate that the SR(s) associated with the first SR configuration(s) is a positive SR. Optionally, no state of the SR bit(s) other than the first state is used to indicate that any one of the SR(s) associated with the first SR configuration(s) is a negative SR.

Specifically, a correspondence between an SR and a state of the SR bit(s) may be configured by the network device or configured by using higher layer signaling. The correspondence configured by the network device or configured by using higher layer signaling may include SRs associated with P SR configurations, and Q states corresponding to the SRs associated with the P SR configurations. In this way, the terminal may determine, based on the correspondence, a state corresponding to an SR associated with the at least one SR configuration (namely, first SR configuration(s)). Herein, Q≥3, Q is a positive integer, P≥2, and P is a positive integer. In this application, the correspondence configured by the network device or configured by using higher layer signaling may be referred to as a second correspondence.

In solution 2, the quantity $O^{SR}$ of the SR bits may be: $O^{SR}=\text{ceil}(\log_2(1+N_{configuration}))$, where $N_{configuration}$ represents the quantity of the SR configurations (namely, the plurality of SR configurations mentioned in the foregoing invention principles) configured for the terminal, and ceil represents rounding up to a next integer. This is another manner in which the quantity $O^{SR}$ of the SR bits is related to the quantity of the SR configurations configured by the network device for the terminal.

Optionally, an index of an SR configuration associated with one positive SR may be used as a maximum value, and SRs associated with SR configurations whose indices are less than the maximum value are all positive SRs. In this way, the terminal device can indicate, based on only a state of an SR bit corresponding to this positive SR, positive SRs associated with a plurality of SR configurations.

For example, it is assumed that a state of the SR bits is "100", used to indicate a positive SR associated with an SR configuration #3. In this case, the index "3" of the SR configuration #3 is used as a maximum value, and SRs respectively associated with an SR configuration #2, an SR configuration #1, and an SR configuration #0 whose indices are less than "3" are all positive SRs. The example is merely used to explain this application, and shall not be construed as any limitation.

Optionally, an index of an SR configuration associated with one positive SR may be used as a minimum value, and SRs associated with SR configurations whose indices are greater than the minimum value are all positive SRs. In this way, the terminal device can indicate, based on only a state of an SR bit corresponding to this positive SR, positive SRs associated with a plurality of SR configurations.

For example, it is assumed that a state of the SR bits is "001", used to indicate a positive SR associated with an SR configuration #1. In this case, the index "1" of the SR configuration #1 is used as a minimum value, and SRs respectively associated with an SR configuration #2 and an SR configuration #3 whose indices are greater than "1" are all positive SRs. The example is merely used to explain this application, and shall not be construed as any limitation.

Technical effects of solution 2 are as follows: Each SR associated with each SR configuration of the at least one SR configuration (namely, first SR configuration(s)) is indicated by using a relatively small quantity of bits, so that an amount of information carried on an uplink control channel can be reduced, thereby increasing a transmission success rate of the uplink control channel.

With reference to the first aspect or the second aspect foregoing embodiment 1 or the foregoing embodiment 2, in some optional implementations, a quantity of HARQ bits sent along with the SR bit(s) is greater than or equal to X, X≥2, and X is a positive integer. This prevents affecting a transmission success rate for a small quantity of HARQ bits. This is because reliability of HARQ transmission design increases as the quantity of HARQ bits increases. In other words, when the quantity of HARQ bits is relatively small, it is not suitable to add a plurality of SR bits after a HARQ bit.

With reference to the first aspect or the second aspect, in some optional implementations, a length of a current time unit is greater than or equal to Y symbols, Y≥1, and Y is a positive integer. This prevents affecting a transmission success rate of an uplink control channel in a time unit of a short length. This is because transmit power of an uplink control channel in a current time unit increases as a time length of a current time-domain resource increases, bringing higher reliability. In other words, when the time length of the current time unit is relatively small, it is not suitable for the uplink control channel in the current time unit to carry a plurality of SR bits.

According to a third aspect, this application provides a terminal device. The terminal device may include a plurality of function modules, configured to accordingly perform the method provided in the first aspect or the method provided in any one of possible implementations of the first aspect.

According to a fourth aspect, this application provides a network device. The network device may include a plurality of function modules, configured to accordingly perform the method provided in the second aspect or the method provided in any one of possible implementations of the second aspect.

According to a fifth aspect, this application provides a terminal device, configured to perform the signal transmission method described in the first aspect. The terminal may include: a memory, and a processor and a transceiver that are coupled to the memory, where the transceiver is configured to communicate with another communications device (for example, a network device). The memory is configured to store code for implementing the signal transmission method described in the first aspect. The processor is configured to execute the program code stored in the memory, in other words, perform the method provided in the first aspect or the method provided in any one of possible implementations of the first aspect.

According to a sixth aspect, this application provides a network device, configured to perform the signal transmission method described in the second aspect. The network device may include: a memory, and a processor and a transceiver that are coupled to the memory, where the transceiver is configured to communicate with another communications device (for example, a terminal). The memory is configured to store code for implementing the signal transmission method described in the second aspect. The processor is configured to execute the program code stored in the memory, in other words, perform the method provided in the second aspect or the method provided in any one of possible implementations of the second aspect.

According to a seventh aspect, this application provides a chip. The chip may include an input interface, an output interface, at least one processor, and at least one memory. The at least one memory is configured to store code. The at least one processor is configured to execute the code in the memory. When the code is executed, the chip implements the method provided in the first aspect or the method provided in any one of possible implementations of the first aspect.

According to an eighth aspect, this application provides a chip. The chip may include an input interface, an output interface, at least one processor, and at least one memory. The at least one memory is configured to store code. The at least one processor is configured to execute the code in the memory. When the code is executed, the chip implements the method provided in the second aspect or the method provided in any one of possible implementations of the second aspect.

According to a ninth aspect, this application provides an apparatus. The apparatus may include: a processor, and one or more interfaces coupled to the processor. The processor is configured to generate a first bit(s) and a hybrid automatic repeat request bit(s), where the first bit(s) is used to indicate a scheduling request(s) associated with a first scheduling request configuration(s), and the first scheduling request configuration(s) is at least one of a plurality of scheduling request configurations. The interface is configured to output the hybrid automatic repeat request bit(s) and the first bit(s) that are generated by the processor.

Specifically, the processor may be configured to invoke, from a memory, a program for implementing the signal transmission method provided in the first aspect, or the signal transmission method provided in any one of possible implementations of the first aspect, and execute an instruction included in the program; and the interface may be configured to output a processing result of the processor.

According to a tenth aspect, this application provides an apparatus. The apparatus may include: a processor, and one or more interfaces coupled to the processor. The processor is configured to determine, based on a first bit(s) from a terminal device, a scheduling request(s) associated with a first scheduling request configuration(s), where the first bit(s) is received during reception of a hybrid automatic repeat request bit(s) from the terminal device in one time unit, the first scheduling request configuration(s) is at least one of a plurality of scheduling request configurations, and the first bit(s) is used to indicate the scheduling requests associated with the first scheduling request configuration(s). The interface is configured to output the scheduling request that is determined by the processor and that is associated with the first scheduling request configuration(s).

Specifically, the processor may be configured to invoke, from a memory, a program for implementing the signal transmission method provided in the second aspect, or the signal transmission method provided in any one of possible implementations of the second aspect, and execute an instruction included in the program; and the interface may be configured to output a processing result of the processor.

According to an eleventh aspect, this application provides a wireless communications system, including a terminal device and a network device. The terminal may be configured to perform the signal transmission method provided in the first aspect, or the signal transmission method provided in any one of possible implementations of the first aspect. The network device may be configured to perform the signal transmission method provided in the second aspect, or the signal transmission method provided in any one of possible implementations of the second aspect.

Specifically, the terminal device may be the terminal device described in the third aspect or the fifth aspect, and the network device may be the network device described in the fourth aspect or the sixth aspect.

According to a twelfth aspect, a computer readable storage medium is provided. The readable storage medium stores program code for implementing the signal transmission method provided in the first aspect, or the signal transmission method provided in any one of possible implementations of the first aspect. The program code includes an instruction for performing the signal transmission method provided in the first aspect, or the signal transmission method provided in any one of possible implementations of the first aspect.

According to a thirteenth aspect, a computer readable storage medium is provided. The readable storage medium stores program code for implementing the signal transmission method provided in the second aspect, or the signal transmission method provided in any one of possible implementations of the second aspect. The program code includes an instruction for performing the signal transmission method provided in the second aspect, or the signal transmission method provided in any one of possible implementations of the second aspect.

BRIEF DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

Terms used in the embodiments of this application are only intended to explain specific embodiments of this application, but not intended to limit this application.

Figure 1:
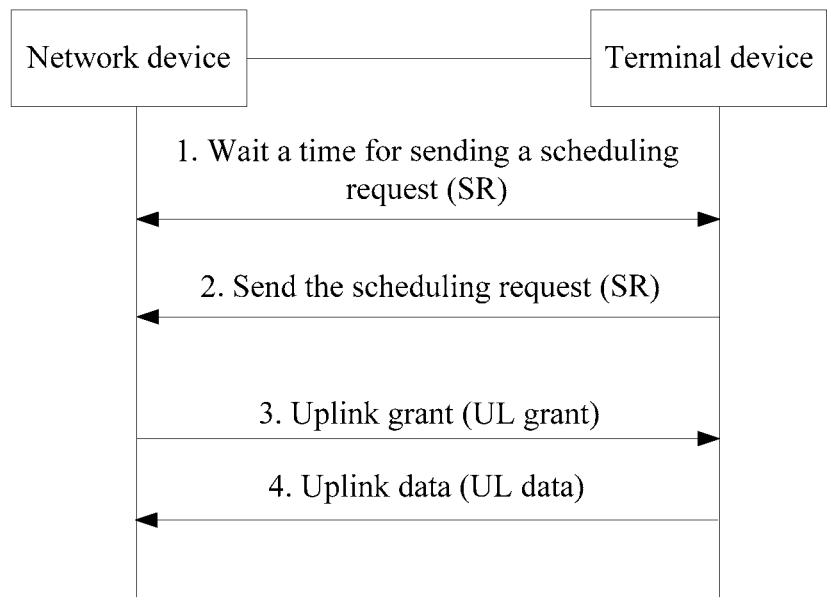
FIG. 1 is a schematic flowchart of an uplink scheduling process in LTE.
Figure 2:
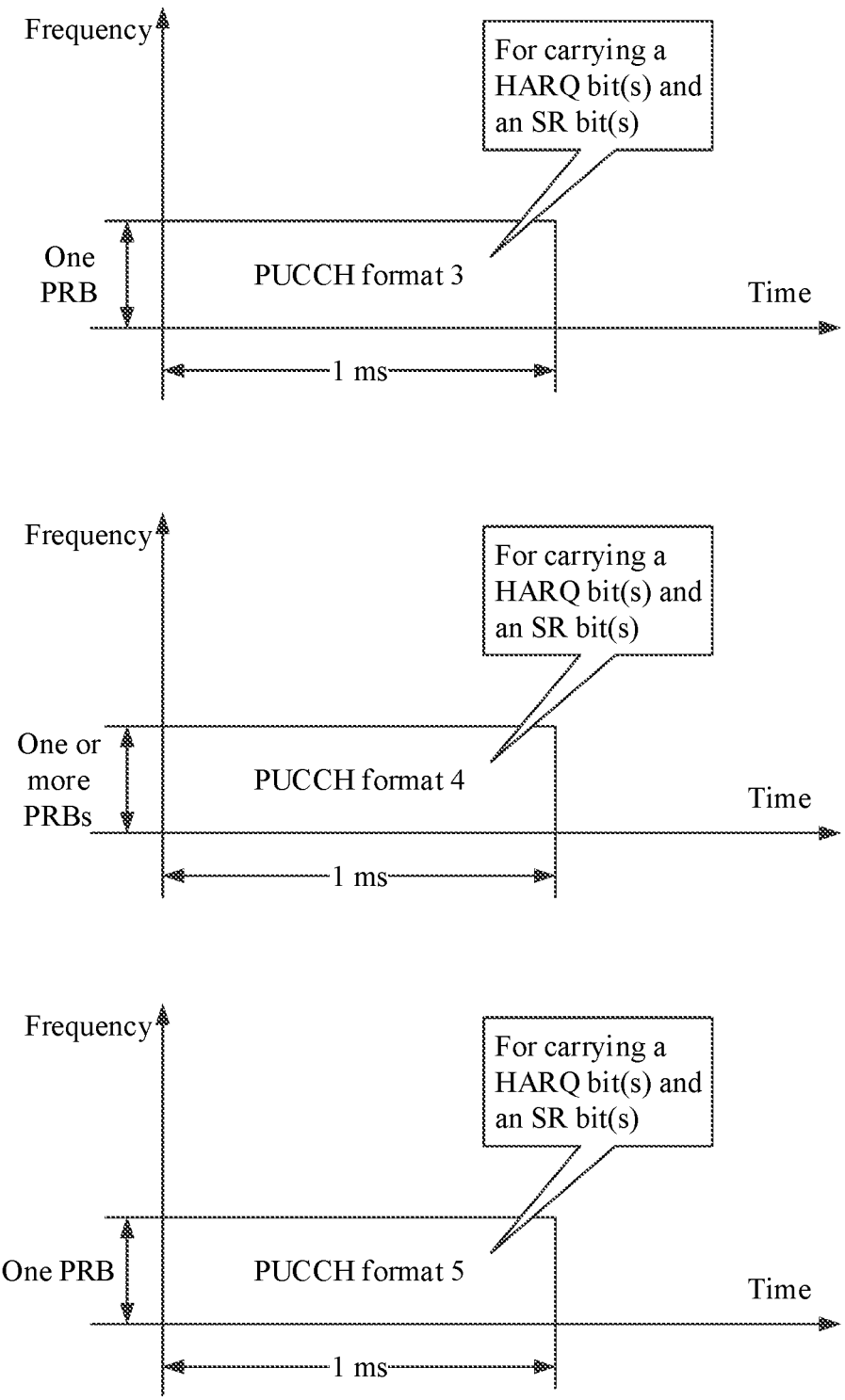
FIG. 2 is a schematic diagram of a HARQ bit(s) and an SR bit(s) transmitted together in different PUCCH formats in LTE.
Figure 3:
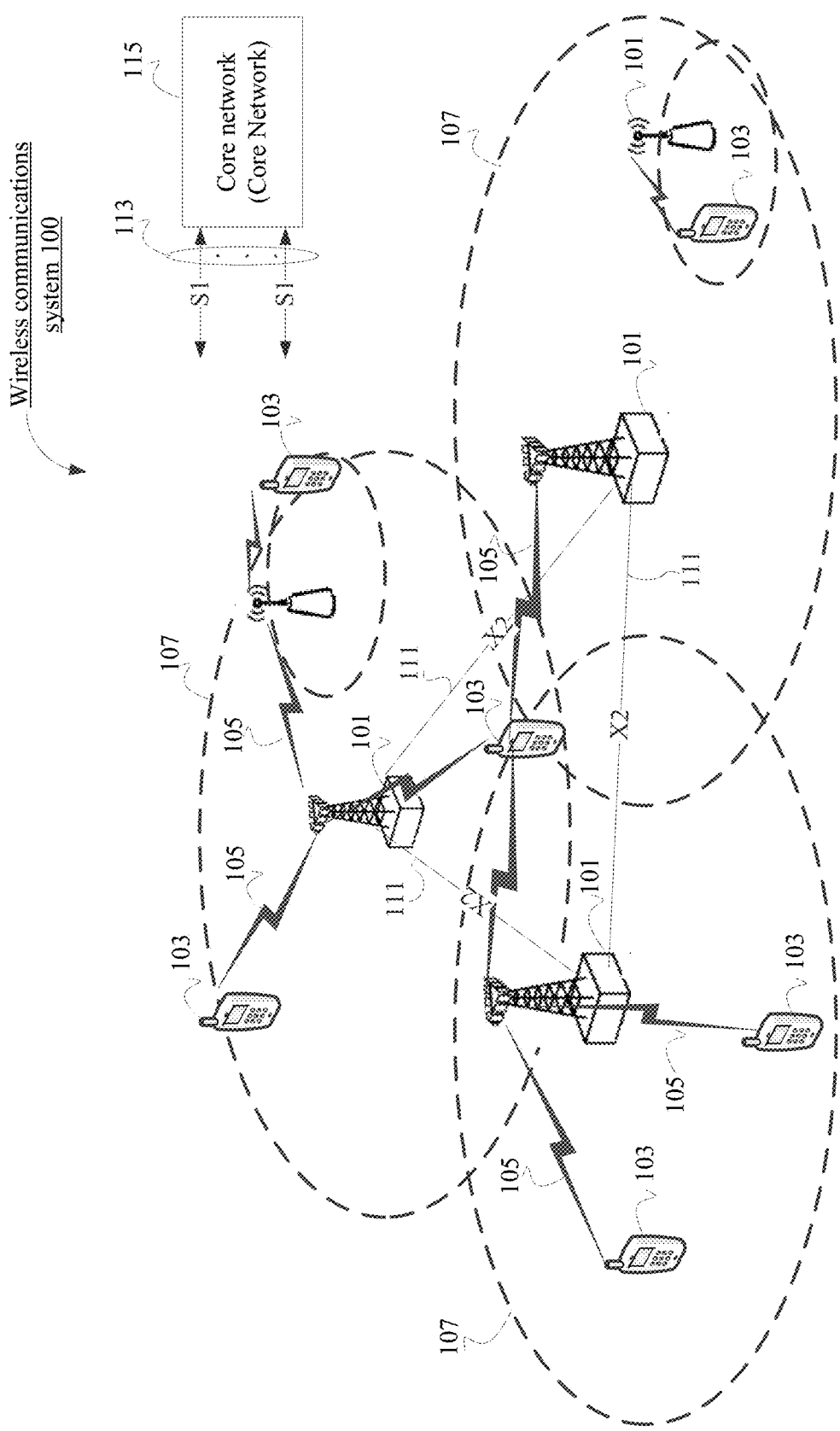
FIG. 3 is a schematic architectural diagram of a wireless communications system according to this application.

FIG. 3 shows a wireless communications system in this application. The wireless communications system may be a global system for mobile communications (GSM) system, a code division multiple access (CDMA) system, a wideband code division multiple access (WCDMA) system, a general packet radio service (GPRS) system, a universal mobile telecommunications system (UMTS), or a long term evolution (LTE) system; or may be a future evolved fifth-generation mobile communications (the 5th Generation, 5G) system, a new radio (NR) system, a machine-to-machine (M2M) communications system, or the like. As shown in FIG. 3, the wireless communications system 100 may include: one or more network devices 101, one or more terminal devices 103, and a core network 115.

The terminal device 103 may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device 103 may be a station (ST) in a wireless local area network (WLAN), a cellular phone, a cordless phone, a session initiation protocol (SIP) phone, a wireless local loop (WLL) station, a personal digital assistant (PDA) device, a handheld device or a computing device having a wireless communications function, another processing device connected to a wireless modem, a vehicle-mounted device, a wearable device, a terminal device 103 in a next-generation communications system such as a fifth-generation (5G) communications network, a terminal device 103 in a future evolved public land mobile network (PLMN)

network, a terminal device 103 in a new radio (NR) communications system, or the like.

By way of example but not limitation, in this embodiment of the present invention, the terminal device 103 may be a wearable device. The wearable device may also be referred to as a wearable intelligent device. The wearable intelligent device is a collective name of wearable devices, such as glasses, gloves, watches, clothes, and shoes, obtained by performing intelligent design and development on daily wearables by using a wearable technology. The wearable device is a portable device that is directly worn on a human body or is integrated into a user's clothes or ornaments. The wearable device is not merely a hardware device, but further implements a powerful function through software support, data exchange, and cloud-based interaction. In a broad sense, the wearable intelligent device includes a device that provides a complete function, has a large size, and can implement all or some functions without relying on a smartphone, for example, a smartwatch or smart glasses; and includes a device that focuses only on a specific type of application and needs to be used in combination with another device such as a smartphone, for example, various smart bands and smart jewelry used for vital sign monitoring.

In addition, the network device 101 may be a device, configured to communicate with a mobile device, in a network. The network device 101 may be an access point (AP) in a WLAN, a base transceiver station (BTS) in a GSM or CDMA system, a NodeB (NB) in a WCDMA system, an evolved NodeB (Evolutional NodeB, eNB or eNodeB) in an LTE system, a relay station or an access point, a vehicle-mounted device, a wearable device, a network device 101 in a future 5G network, a network device 101 in a future evolved PLMN network, a new-generation NodeB (gNodeB) in an NR system, or the like.

In addition, in this embodiment of the present invention, the network device 101 provides a cell with a service, and the terminal device 103 communicates with the network device 101 by using a transmission resource (for example, a frequency domain resource, or referred to as a frequency spectrum resource) used by the cell. The cell may be a cell corresponding to the network device 101 (for example, a base station). The cell may belong to a macro base station, or a base station corresponding to a small cell. The small cell herein may include: a metro cell, a micro cell, a pico cell, a femto cell, or the like. These small cells feature a small coverage area and low transmitting power, and are suitable for providing a high-rate data transmission service.

Furthermore, in an LTE system or an NR system, a plurality of cells may simultaneously work at a same frequency on a carrier, and it may be considered that the concept "carrier" is equivalent to the concept "cell" in some special scenarios. For example, in a carrier aggregation (CA) scenario, when a secondary carrier is configured for UE, configuration information carries both a carrier index of the secondary carrier and a cell identity (Cell ID) of a secondary cell working on the secondary carrier. In this case, it may be considered that the concept "carrier" is equivalent to the concept "cell". For example, UE's access to a carrier is equivalent to the UE's access to a cell.

In this embodiment of the present invention, the network device 101 (or the terminal 103) may work on a licensed frequency band or a license-free frequency band.

It should be noted that, the wireless communications system 100 shown in FIG. 3 is merely intended to describe the technical solutions in this application more clearly, but shall not be construed as any limitation on this application. A person of ordinary skill in the art may be aware that, with evolution of network architectures and emergence of new service scenarios, the technical solutions provided in this application are also applicable to similar technical problems.

Figure 4:
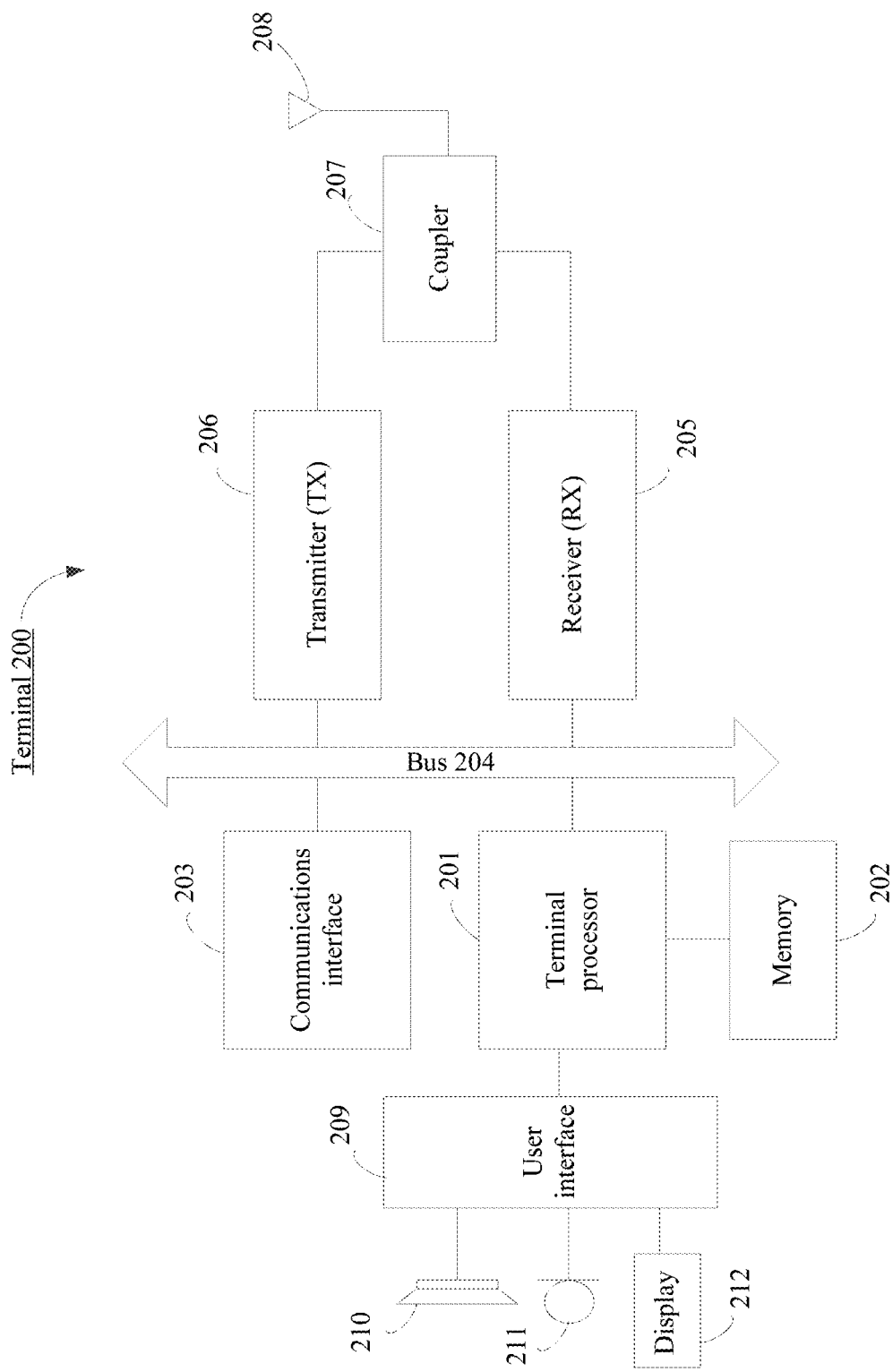
FIG. 4 is a schematic hardware architectural diagram of a terminal according to an embodiment of this application.

FIG. 4 shows a terminal device 200 according to some embodiments of this application. As shown in FIG. 4, the terminal device 200 may include: one or more terminal processors 201, a memory 202, a communications interface 203, a receiver 205, a transmitter 206, a coupler 207, an antenna 208, a user interface 209, and an input/output module (including an audio input/output module 210, a button input module 211, a display 212, and the like). These components may be connected by using a bus 204 or in another manner, and are connected, for example, by using a bus in FIG. 4.

The communications interface 203 may be used by the terminal device 200 to communicate with another communications device, for example, a network device. Specifically, the network device may be a network device 300 shown in FIG. 5. Specifically, the communications interface 203 may be a long term evolution (LTE) (4G) communications interface, or may be a 5G communications interface or a future new radio communications interface. The communications interface 203 is not limited to a wireless communications interface. The terminal device 200 may be further equipped with a wired communications interface 203, for example, a local access network (LAN) interface.

The transmitter 206 may be configured to perform transmitting processing, for example, signal modulation, on a signal output by the terminal processor 201. The receiver 205 may be configured to perform reception processing, for example, signal demodulation, on a mobile communications signal received by the antenna 208. In some embodiments of this application, the transmitter 206 and the receiver 205 may be considered as a wireless modem. In the terminal device 200, there may be one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to split a mobile communications signal received by the antenna 208 into a plurality of signals, and allocate the signals to a plurality of receivers 205.

The terminal device 200 may further include other communications components, such as a GPS module, a Bluetooth® module, and a wireless fidelity (Wi-Fi) module, in addition to the transmitter 206 and the receiver 205 shown in FIG. 4. The terminal device 200 may further support other wireless communications signals, such as a satellite signal and a short-wave signal, in addition to the foregoing described wireless communications signal. The terminal device 200 may be further equipped with a wired network interface (for example, a LAN interface) to support wired communication, in addition to wireless communication.

The input/output module may be configured to implement interaction between the terminal device 200 and a user/an external environment, and may mainly include the audio input/output module 210, the button input module 211, the display 212, and the like. Specifically, the input/output module may further include: a camera, a touchscreen, a sensor, or the like. The input/output module communicates with the terminal process 201 only by using the user interface 209.

The memory 202 is coupled to the terminal processor 201, and is configured to store various software programs and/or a plurality of sets of instructions. Specifically, the memory 202 may include a high-speed random access memory, and may also include a non-transitory memory, for example, one or more disk storage devices, a flash memory, or another non-transitory solid state storage device. The memory 202 may store an operating system (briefly referred to as a system below), for example, an embedded operating system such as Android, IoS, Windows, or Linux. The memory 202 may further store a network communications program. The network communications program may be used to communicate with one or more additional devices, one or more terminal devices, and one or more network devices. The memory 202 may further store a user interface program. The user interface program may vividly display content of an application program by using a graphical operation interface; and receive, by using input controls such as a menu, a dialog box, and a button, a control operation performed by a user on the application program.

In some embodiments of this application, the memory 202 may be configured to store a program for implementing, on the terminal device 200 side, a signal transmission method provided in one or more embodiments of this application. For implementation of the signal transmission method provided in one or more embodiments of this application, refer to a subsequent embodiment.

The terminal processor 201 may be configured to read and execute a computer readable instruction. Specifically, the terminal processor 201 may be configured to invoke a program stored in the memory 202, for example, a program for implementing, on the terminal device 200 side, a signal transmission method provided in one or more embodiments of this application, and execute an instruction included in this program.

It may be understood that, the terminal device 200 may be the terminal 103 in the wireless communications system 100 shown in FIG. 3, and may be implemented as a mobile device, a mobile station, a mobile unit, a radio unit, a remote unit, a user agent, a mobile client, or the like.

It should be noted that, the terminal device 200 shown in FIG. 4 is merely an implementation of an embodiment of this application. During practical application, the terminal device 200 may further include more or fewer components, and this is not limited herein.

Figure 5:
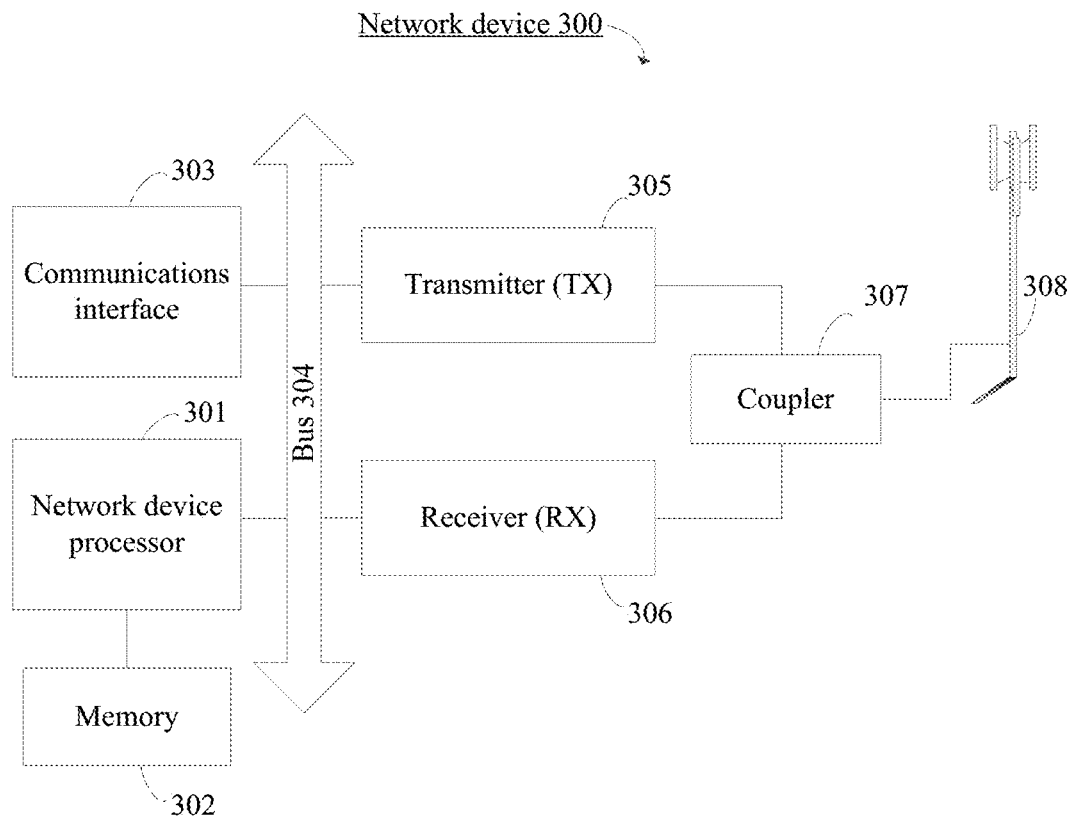
FIG. 5 is a schematic hardware architectural diagram of a network device according to an embodiment of this application.

FIG. 5 shows a network device 300 according to some embodiments of this application. As shown in FIG. 5, the network device 300 may include: one or more network device processors 301, one or more memories 302, one or more communications interfaces 303, one or more transmitters 305, one or more receivers 306, one or more couplers 307, and one or more antennas 308. These components may be connected by using a bus 304 or connected in another manner. FIG. 5 is an example by using a bus.

The communications interface 303 may be used by the network device 300 to communicate with another communications device, for example, a terminal device or another network device. Specifically, the terminal device may be the terminal device 200 shown in FIG. 4. Specifically, the communications interface 303 may be a long term evolution (LTE) (4G) communications interface, or may be a 5G communications interface or a future new radio communications interface. The communications interface 303 is not limited to a wireless communications interface. The network device 300 may be further equipped with a wired communications interface 303 to support wired communication. For example, a backhaul link between one network device 300 and another network device 300 may be a wired communications connection.

The transmitter 305 may be configured to perform transmit processing, for example, signal modulation, on a signal output by the network device processor 301. The receiver 306 may be configured to perform reception processing, for example, signal demodulation, on a mobile communications signal received by the antenna 308. In some embodiments of this application, the transmitter 305 and the receiver 306 may be considered as a wireless modem. In the network device 300, there may be one or more transmitters 305 and one or more receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to split a mobile communications signal into a plurality of signals, and allocate the signals to a plurality of receivers 306.

The memory 302 is coupled to the network device processor 301, and is configured to store various software programs and/or a plurality of sets of instructions. Specifically, the memory 302 may include a high-speed random access memory, and may also include a non-transitory memory, for example, one or more disk storage devices, a flash memory, or another non-transitory solid state storage device. The memory 302 may store an operating system (briefly referred to as a system below), for example, an embedded operating system such as uCOS, VxWorks, or RTLinux. The memory 302 may further store a network communications program. The network communications program may be used to communicate with one or more additional devices, one or more terminal devices, and one or more network devices.

The network device processor 301 may be configured to perform radio channel management, implement establishment and disconnection of a call or a communication link, and provide a user in a current control area with cell handover control and the like. Specifically, the network device processor 301 may include: an administration module/communication module (AM/CM) (a center configured to perform speech channel switching and information exchange), a basic module (BM) (configured to implement call processing, signaling processing, radio resource management, radio link management, and a circuit maintenance function), a transcoder and submultiplexer (TCSM) unit (configured to implement multiplexing, demultiplexing, and a transcoding function), and the like.

In this embodiment of this application, the network device processor 301 may be configured to read and execute a computer readable instruction. Specifically, the network device processor 301 may be configured to invoke a program stored in the memory 302, for example, a program for implementing, on the network device 300 side, a signal transmission method provided in one or more embodiments of this application, and execute an instruction included in this program.

It may be understood that, the network device 300 may be the base station 101 in the wireless communications system 100 shown in FIG. 3, and may be implemented as a base transceiver station, a wireless transceiver, a basic service set (BSS), an extended service set (ESS), a NodeB, an eNodeB, an access point or a TRP, or the like.

It should be noted that, the network device 300 shown in FIG. 5 is merely an implementation of an embodiment of this application. During practical application, the network device 300 may further include more or fewer components, and this is not limited herein.

Based on the embodiments respectively corresponding to the foregoing wireless communications system 100, terminal device 200, and network device 300, this application provides a signal transmission method, as described in detail below.

First, to help understand this application, the following describes basic concepts in this application.

(1) Scheduling Request Configuration (Scheduling Request Configuration, Briefly Referred to as an SR Configuration Below)

An SR configuration may be dynamically configured by a network device for a terminal, or may be configured by a network device for a terminal by using higher layer signaling. The higher layer signaling may be signaling sent by a higher protocol layer. The higher protocol layer is at least one protocol layer in all protocol layers above a physical layer. Specifically, the higher protocol layer may be at least one of the following protocol layers: a medium access control (MAC) layer, a radio link control (RLC) layer, a packet data convergence protocol (PDCP) layer, a radio resource control (RRC) layer, a non-access stratum (NAS) layer, and the like.

It may be understood that an SR configuration is associated with a first scheduling request(s) in at least one of the following manners:

1. The SR configuration may be used to indicate a time-domain location and/or a frequency-domain location of the first scheduling request(s). For example, the SR configuration indicates a time period in which the first scheduling request(s) can be sent, in other words, a time-domain location corresponding to the time period is a time-domain location at which the first scheduling request(s) can be sent. The SR configuration indicates a subcarrier spacing on which the first scheduling request(s) can be sent, in other words, a subcarrier size corresponding to the subcarrier spacing is a subcarrier on which the first scheduling request(s) can be sent.

Table 1-1, Table 1-2, and Table 1-3 show examples of three SR configurations.

TABLE 1-1

| SR configuration index number | Time-domain location |
|---|---|
| SR configuration #0 | Once every 2 ms |
| SR configuration #1 | Once every seven symbols |
| SR configuration #2 | Once every slot |

TABLE 1-2

| SR configuration index number | Frequency-domain location |
|---|---|
| SR configuration #0 | Physical resource block 1 |
| SR configuration #1 | Physical resource block 2 |
| SR configuration #2 | Physical resource block 1 |

TABLE 1-3

| SR configuration index number | Time-domain location | Frequency-domain location |
|---|---|---|
| SR configuration #0 | Once every 2 ms | Physical resource block 1 |
| SR configuration #1 | Once every seven symbols | Physical resource block 2 |
| SR configuration #2 | Once every symbol | Physical resource block 3 |

It can be learned that, a plurality of SR configurations may indicate a same time-domain location, or may indicate different time-domain locations; and a plurality of SR configurations may indicate a same frequency-domain location, or may indicate different frequency-domain locations.

2. The SR configuration may be used to indicate a length of a time unit occupied by an uplink control channel that carries the first scheduling request(s) and/or a size of a subcarrier spacing occupied by an uplink control channel that carries the first scheduling request(s). For example, the SR configuration indicates that a length of a time unit occupied by an uplink control channel that carries the first scheduling request(s) is two symbols, in other words, the first scheduling request(s) can be sent on a two-symbol uplink control channel.

Table 2-1, Table 2-2, and Table 2-3 show examples of three SR configurations.

TABLE 2-1

| SR configuration index number | Length of a time unit occupied by an uplink control channel |
|---|---|
| SR configuration #0 | 1-ms subframe |
| SR configuration #1 | 7 symbols |
| SR configuration #2 | 1 slot |

TABLE 2-2

| SR configuration index number | Size of a subcarrier spacing occupied by an uplink control channel |
|---|---|
| SR configuration #0 | 15 kHz |
| SR configuration #1 | 60 kHz |
| SR configuration #2 | 30 kHz |

TABLE 2-3

| SR configuration index number | Length of a time unit occupied by an uplink control channel | Size of a subcarrier spacing occupied by an uplink control channel |
|---|---|---|
| SR configuration #0 | 1-ms subframe | 15 kHz |
| SR configuration #1 | 7 symbols | 60 kHz |
| SR configuration #2 | 1 symbol | 30 kHz |

It can be learned that, a plurality of SR configurations may indicate a same length of a time unit occupied by an uplink control channel, or may indicate different lengths of a time unit occupied by an uplink control channel; and a plurality of SR configurations may indicate a same size of a subcarrier spacing occupied by an uplink control channel, or may indicate different sizes of a subcarrier spacing occupied by an uplink control channel.

3. The SR configuration may be used to indicate an attribute (Numerology/TTI/logical channel) of a resource requested in the first scheduling request(s). Different SR configurations are for different services, because a requirement for an attribute of a resource varies according to different services. Specifically, an attribute of a frequency-domain resource requested in the first scheduling request(s) is a first numerology (for example, a first subcarrier spacing (SCS)), and/or an attribute of a time-domain resource requested in the first scheduling request(s) is a first time unit, and/or a logical channel requested in the first scheduling request(s) is a first logical channel, and/or a priority of a logical channel requested in the first scheduling request(s) is a second priority.

Table 3-1, Table 3-2, Table 3-3, and Table 3-4 show examples of three SR configurations.

TABLE 3-1

| SR configuration index number | Attribute of a requested time-domain resource (time unit) |
|---|---|
| SR configuration #0 | 1 ms |
| SR configuration #1 | 2 symbols |
| SR configuration #2 | 1 slot |

TABLE 3-2

| SR configuration index number | Attribute of a requested time-domain resource (time unit) | Service |
|---|---|---|
| SR configuration #0 | 1 ms | Service #0 |
| SR configuration #1 | 2 symbols | Service #1 |
| SR configuration #2 | 1 slot | Service #2 |

TABLE 3-3

| SR configuration index number | Attribute of a requested time-domain resource (time unit) | Attribute (Numerology) of a requested frequency-domain resource |
|---|---|---|
| SR configuration #0 | 1 ms | 15 kHz |
| SR configuration #1 | 2 symbols | 60 kHz |
| SR configuration #2 | 1 slot | 30 kHz |

TABLE 3-4

| SR configuration index number | Attribute of a requested time-domain resource (time unit) | Service |
|---|---|---|
| SR configuration #0 | 1 ms | Sen-ice #0 |
| SR configuration #1 | 2 symbols | Service #1 |
| SR configuration #2 | 1 slot | Service #2 |

It can be learned that, a plurality of SR configurations may indicate a same attribute of a requested time-domain resource, or may indicate different attributes of a requested time-domain resource; and a plurality of SR configurations may indicate a same attribute of a requested frequency-domain resource, or may indicate different attributes of a requested frequency-domain resource.

It should be noted that the foregoing three SR configurations respectively correspond to requirements for different services. It can be learned that, if a service requires a relatively short time, an SR configuration whose requested time unit is relatively small may be configured for a terminal; or if a service requires a relatively long time, an SR configuration whose requested time unit is relatively large may be configured for a terminal.

The foregoing examples are merely used to explain the invention principles of this application, and shall not be construed as any limitation.

(2) Scheduling Request Bit (Scheduling Request Bit, Briefly Referred to as an SR Bit(s) Below)

The SR bit(s) is used to indicate an SR(s) reported by a terminal device, and specifically indicate an SR(s) associated with a specific SR configuration(s) and indicate whether the reported SR(s) associated with the SR configuration(s) is a positive SR(s) or a negative SR(s).

There may be one or more SR bits. In this application, a quantity of SR bits is greater than or equal to 2. The quantity of SR bits may be related to a quantity of SR configurations.

Optionally, in this application, an SR bit(s) and a HARQ bit(s) are carried on a same uplink control channel.

Specifically, a terminal may determine a quantity of SR bits based on a quantity of SR configurations. Optionally, the quantity of SR bits may be equal to the quantity of SR configurations. Optionally, the quantity of SR bits may be equal to: $\text{ceil}(\log_2(1+N_{configuration}))$, where $N_{configuration}$ represents the quantity of SR configurations, and ceil represents rounding up to a next integer. For a correlation between the quantity of SR bits and the quantity of SR configurations, refer to the subsequent Embodiment 1 and Embodiment 2. Details are not described herein again.

For example, it is assumed that an SR configuration #0 and an SR configuration #1 in Table 3-4 are SR configurations in a slot #0.

When the slot #0 arrives, the terminal may indicate, by using two bits, SRs associated with the SR configurations in the slot #0 that are configured for the terminal. One bit (for example, a most significant bit) is used to indicate whether an SR associated with the SR configuration #0 is a positive SR or a negative SR. The other bit (for example, a least significant bit) is used to indicate whether an SR associated with the SR configuration #1 is a positive SR or a negative SR. In other words, the two bits are SR bits, and one bit corresponds to one SR configuration.

When the slot #0 arrives, the terminal may indicate, still by using two bits, SRs associated with the SR configurations in the slot #0 that are configured for the terminal. When the two bits are "01", it indicates that the terminal device reports, in the slot #0, only a positive SR associated with the SR configuration #1 and does not report an SR associated with the SR configuration #0; or when the two bits are "10", it indicates that the terminal device reports, in the slot #0, only a positive SR associated with the SR configuration #0 and does not report an SR associated with the SR configuration #1; or when the two bits are "00", it indicates that the terminal device reports, in the slot #0, both a negative SR associated with the SR configuration #0 and a negative SR associated with the SR configuration #1.

(3) Time Unit

In this application, a length of one time unit may be set to any value, and is not limited herein.

For example, one time unit may include one or more subframes.

Alternatively, one time unit may include one or more slots.

Alternatively, one time unit may include one or more mini-slots.

Alternatively, one time unit may include one or more symbols.

Alternatively, one time unit may include one or more transmission time intervals (Transmission Time Interval, TTI).

Alternatively, one time unit may include one or more short transmission time intervals (sTTI).

Alternatively, one time unit may correspond to a time mode. For example, a first time mode is a two-symbol or three-symbol transmission time interval, and a second time mode is a seven-symbol transmission time interval.

The mini-slot includes one or more symbols, and is less than or equal to a slot. Herein, the mini-slot may be a mini-slot in a system with a 60 kHz subcarrier spacing, or may be a mini-slot in a system with a 15 kHz subcarrier spacing, and this is not limited in the embodiments of the present invention.

The slot includes one or more symbols. Herein, the slot may be a slot in a system with a 60 kHz subcarrier spacing, or may be a slot in a system with a 15 kHz subcarrier spacing, and this is not limited in the embodiments of the present invention.

The TTI is a parameter commonly used in a current communications system (for example, an LTE system), and is a scheduling unit used for data transmission scheduling on a radio link. In the prior art, generally it is considered that 1 TTI=1 ms. In other words, one TTI is one subframe, or a size of two slots. The TTI is a basic unit of time managed in radio resource management (for example, scheduling).

(4) Hybrid Automatic Repeat Request (HARQ) Bit, Briefly Referred to as a HARQ Bit Below A HARQ bit is used to feed back a result of decoding one or more downlink data blocks by a terminal, and may be a positive acknowledgment ACK or a negative acknowledgment ACK. The ACK indicates that the terminal has correctly performed the decoding. The NACK indicates that an error has occurred during the decoding by the terminal. Specifically, the terminal may feed back the HARQ bit to a network device, or the terminal may feed back the HARQ bit to another terminal. Further, if the terminal feeds back a negative acknowledgment, a device that receives the HARQ bit retransmits data for which an error has occurred during the decoding by the terminal, to help the terminal correctly receive downlink data.

The foregoing example is merely used to explain this application, and shall not be construed as any limitation. Correlation between a quantity of SR bits and a quantity of SR configurations configured for a terminal is described in detail in a subsequent embodiment, and details are not described herein again.

Second, main invention principles of this application may include: selecting, by a terminal device, at least one SR configuration from a plurality of SR configurations; and then sending, by the terminal, a hybrid automatic repeat request bit(s) and an SR bit(s) in one time unit, where the SR bit(s) is used to indicate each SR(s) associated with each SR configuration of the at least one SR configuration. Correspondingly, a network device may receive the HARQ bit(s) and the SR bit(s) from the terminal, and determine, based on the SR bit(s), an SR reported by the terminal. In this way, the terminal device may indicate which SR configuration reported by the terminal device is associated with a positive SR and/or which SR configuration reported by the terminal device is associated with a negative SR. In this application, a plurality of SR configurations can be supported, so as to adapt to a multi-service scenario in future 5G.

In this application, the SR bit(s) may be referred to as a first bit(s), and the foregoing at least one SR configuration may be referred to as a first SR configuration(s). The foregoing at least one SR configuration may be an SR configuration(s), configured by the network device for the terminal device, in a current time unit (namely, one time unit). Herein, the current time unit may be a time unit in which the terminal device is ready to send the HARQ bit(s) and the SR bit(s). In this application, a positive SR indicates, to the terminal device, that there is currently uplink data for the terminal, or the network device currently needs to allocate a resource used for transmission to the terminal. The resource used for transmission may be scheduled by the network device or may be predefined. A negative SR indicates, to the terminal device, that there is currently no uplink data for the terminal device, or there is currently no need to allocate a resource used for transmission to the terminal. It may be understood that, if a receiving device receives only a positive SR associated with an SR configuration, the receiving device may consider that SR configurations other than this SR configuration in the at least one SR configuration are all negative SRs. The receiving device may be a network device or a terminal.

In this application, the network device may further configure a time unit in which the plurality of SR configurations are located. Herein, a time unit in which an SR configuration is located is a time unit in which the terminal device can report an SR associated with the SR configuration. In other words, if an SR configuration exists in one time unit, it indicates that the terminal device can report, in this time unit, an SR associated with this SR configuration. It may be understood that an SR configuration configured for the terminal may indicate the time unit.

Figure 6:
FIG. 6 is a schematic diagram of a plurality of SR configurations according to this application.
Figure 6:
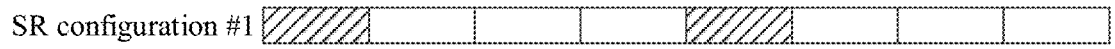
Figure 6:
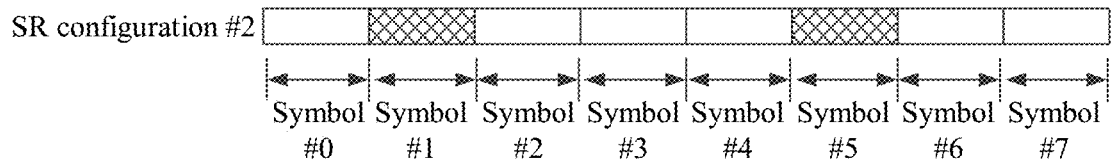

FIG. 6 shows an example of a time unit in which three SR configurations (an SR configuration #0, an SR configuration #1, and an SR configuration #2) configured by the network device are located. As shown in FIG. 6, a time unit in which the SR configuration #0 is located is a symbol #0, a symbol #2, a symbol #4, and a symbol #6. This indicates that the terminal device can send, on the four symbols, an SR associated with the SR configuration #0. The example is merely used to explain the embodiments of this application, and shall not be construed as any limitation.

It may be understood that, although a time unit in which the terminal device reports an SR is configured by the network device, or configured by using higher layer signaling, or configured by the terminal device, generating an SR is behavior of the terminal device; therefore, the network device knows only that an SR associated with a specific SR configuration may exist in a specific time unit, but does not know which SR associated with SR configuration is actually reported by the terminal device in this specific time unit. To make the network device know which SR configuration actually reported by the terminal device in this specific time unit is associated with the SR, the terminal device needs to send an SR bit to the network device.

For example, in the example shown in FIG. 6, the terminal device may determine, according to an actual requirement, to report, on the symbol #0, only the SR associated with the SR configuration #0 and not to report an SR associated with the SR configuration #1. The terminal device sends two SR bits "10" to the network device, so that the network device can know, based on the two SR bits "10", that the terminal device actually reports, on the symbol #0, only the SR associated with the SR configuration #0 and does not report the SR associated with the SR configuration #1.

For example, in the example shown in FIG. 6, the terminal device may determine, according to an actual requirement, to report, on the symbol #0, the SR associated with the SR configuration #0 and an SR associated with the SR configuration #1. A most significant bit "1" is used to indicate whether the SR associated with the SR configuration #0 is a positive SR or a negative SR, and a least significant bit "0" is used to indicate whether the SR associated with the SR configuration #1 is a positive SR or a negative SR. In this way, the network device can know, based on the two SR bits "10", that the terminal device actually reports the SR associated with the SR configuration #0 and the SR associated with the SR configuration #1 on the symbol #0. The example is merely used to explain this application, and shall not be construed as any limitation.

In this application, there may be a correlation between a quantity of SR bits and a quantity of the plurality of SR configurations configured by the network device for the terminal device. This correlation is specifically described in a subsequent embodiment, and details are not described herein again. Optionally, the quantity of the plurality of SR configurations is greater than or equal to 2. First, the following describes several manners in which the quantity of the plurality of SR configurations are defined.

(1) In manner 1, the quantity of the plurality of SR configurations is equal to a quantity of all SR configurations. In other words, the plurality of SR configurations may be all SR configurations dynamically configured by the network device for the terminal, or may be all SR configurations configured by the network device for the terminal by using higher layer signaling, or may be all SR configurations configured by another terminal device for the terminal.

Figure 8:
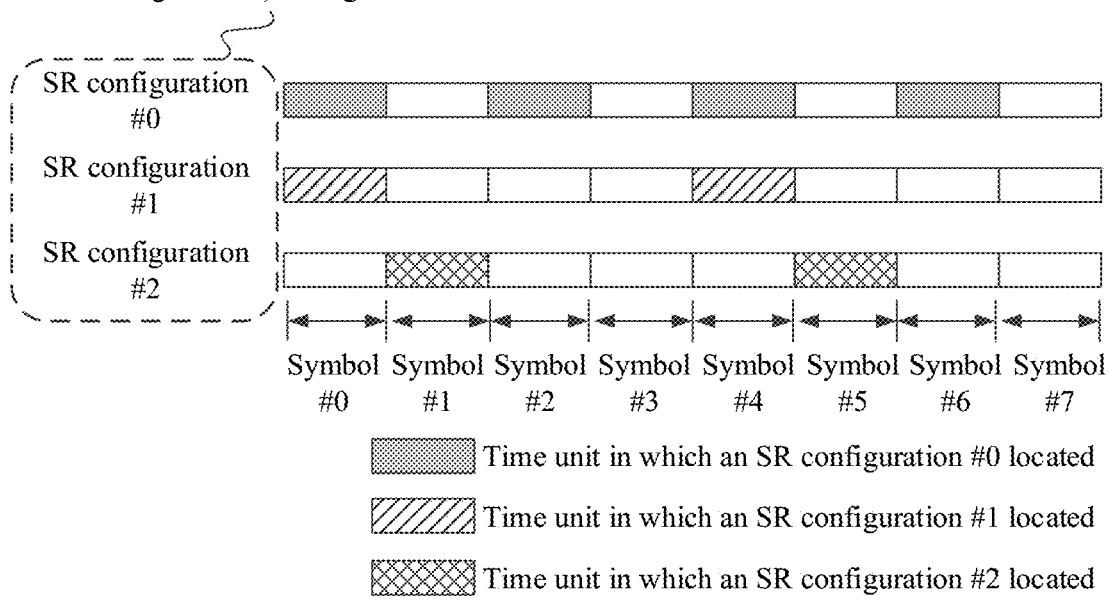
FIG. 8 is a schematic diagram of a plurality of SR configurations configured by a network device for a terminal device according to an embodiment of this application.

For example, as shown in FIG. 8, all SR configurations configured by the network device for the terminal device are: an SR configuration #0, an SR configuration #1, and an SR configuration #2. In other words, a quantity of all the SR configurations configured by the network device for the terminal is 3. It can be learned, from FIG. 8, that some SR configurations in all the SR configurations may be separately used in each time unit (symbol). A first bit(s) is used to indicate an SR(s) associated with at least one SR configuration in all the SR configurations. For example, the SR configuration #0 and the SR configuration #1 are used on a symbol #0, and the first bit(s) is used to indicate an SR associated with the SR configuration #0 and/or the SR configuration #1 in all the SR configurations; and the SR configuration #2 is used on a symbol #1, and the first bit(s) is used to indicate an SR associated with the SR configuration #2 in all the SR configurations. The example is merely used to explain this application, and shall not be construed as any limitation.

In manner 1, efficiency in reporting, by the terminal device, SRs associated with all the SR configurations can be improved. For example, as shown in FIG. 8, even if a time unit corresponding to the SR configuration #2 is on the symbol #1 but not on the symbol #0, the terminal device can notify, on the symbol #0, the network device of the SR associated with the SR configuration #2, instead of notifying, until the symbol #1, the network device of the SR associated with the SR configuration #2, thereby improving efficiency. The example is merely used to explain this application, and shall not be construed as any limitation.

(2) In manner 2, the quantity of the plurality of SR configurations is equal to a quantity of SR configurations in the time unit. To be specific, the plurality of SR configurations may be SR configurations in the time unit that are dynamically configured by the network device for the terminal, or may be SR configurations in the time unit that are configured by the network device for the terminal by using higher layer signaling, or may be SR configurations in the time unit that are configured by another terminal for the terminal.

Figure 9:
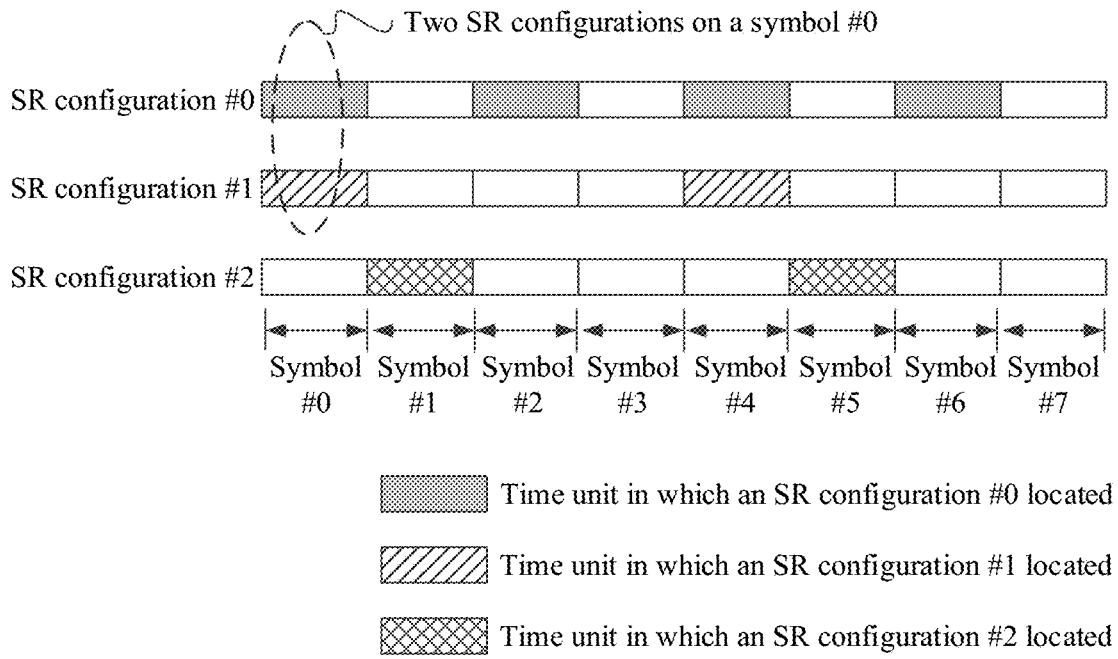
FIG. 9 is a schematic diagram of a plurality of SR configurations configured by a network device for a terminal device according to another embodiment of this application.

For example, as shown in FIG. 9, SR configurations on a symbol #0 that are configured by the network device for the terminal device are: an SR configuration #0 and an SR configuration #1. In other words, a quantity of SR configurations on the symbol #0 that are configured by the network device for the terminal is 2, and a first bit(s) is used to indicate an SR(s) associated with at least one SR configuration in the SR configuration #0 and the SR configuration #1. For another example, as shown in FIG. 9, an SR configuration that is configured by the network device for the terminal device and that is on a symbol #1 is an SR configuration #2. In other words, a quantity of SR configurations on the symbol #1 that are configured by the network device for the terminal is 1, and a first bit(s) is used to indicate an SR(s) associated with an SR configuration #2. The examples are merely used to explain this application, and shall not be construed as any limitation.

In manner 2, SR configurations in one time unit that are configured for the terminal may include SR configurations associated with different uplink control channel attributes. For details about an uplink control channel attribute associated with an SR configuration, refer to description of a subsequent manner 4. Explanation is not given herein.

In manner 2, only SRs associated with SR configurations in the time unit that are actually configured for the terminal are reported, to reduce SR bit overheads. For example, as shown in FIG. 8, there is an SR configuration #0 and an SR configuration #1 on a symbol #0, and the terminal device can notify, by using only two bits, an SR associated with the SR configuration #0 and an SR associated with the SR configuration #1; and there is only an SR configuration #2 on a symbol #1, and the terminal device can notify, by using only one bit, an SR associated with the SR configuration #2. The example is merely used to explain this application, and shall not be construed as any limitation.

(3) In manner 3, the quantity of the plurality of SR configurations is equal to a quantity of SR configurations in a plurality of time units. In other words, the plurality of SR configurations may be SR configurations that are dynamically configured by the network device for the terminal and that are in a plurality of time units, or may be SR configurations that are configured by the network device for the terminal by using higher layer signaling and that are in a plurality of time units, or may be SR configurations that are configured by another terminal for the terminal and that are in a plurality of time units. The plurality of time units include one time unit in which the terminal sends the hybrid automatic repeat request bit(s) and the first bit(s).

Figure 10:
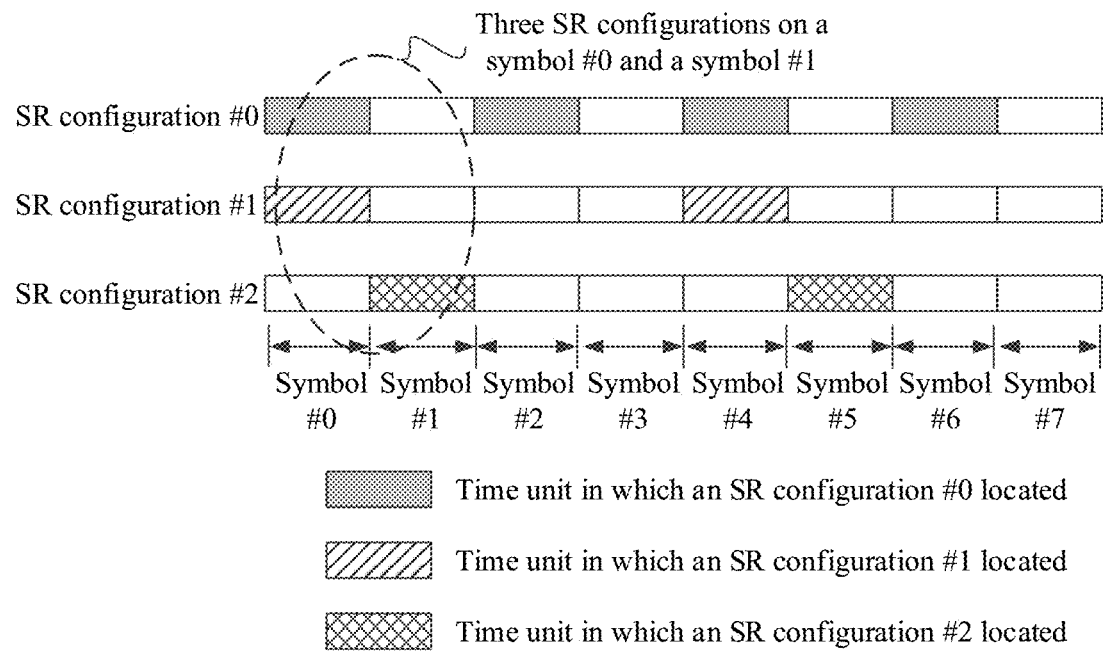
FIG. 10 is a schematic diagram of a plurality of SR configurations configured by a network device for a terminal device according to still another embodiment of this application.

For example, as shown in FIG. 10, SR configurations on a symbol #0 that are configured by the network device for the terminal device are: an SR configuration #0 and an SR configuration #1; and an SR configuration that is configured by the network device for the terminal device and that is on a symbol #1 is an SR configuration #2. In other words, total SR configurations that are configured by the network device for the terminal and that are on the symbol #0 and a symbol #1: the SR configuration #0, the SR configuration #1, and the SR configuration #2. A quantity of SR configurations that are configured by the network device for the terminal and that are on the symbol #0 and the symbol #1 is 3, and a first bit(s) is used to indicate an SR(s) associated with at least one SR configuration in the SR configuration #0, the SR configuration #1, and the SR configuration #2. The example is merely used to explain this application, and shall not be construed as any limitation.

Figure 11:
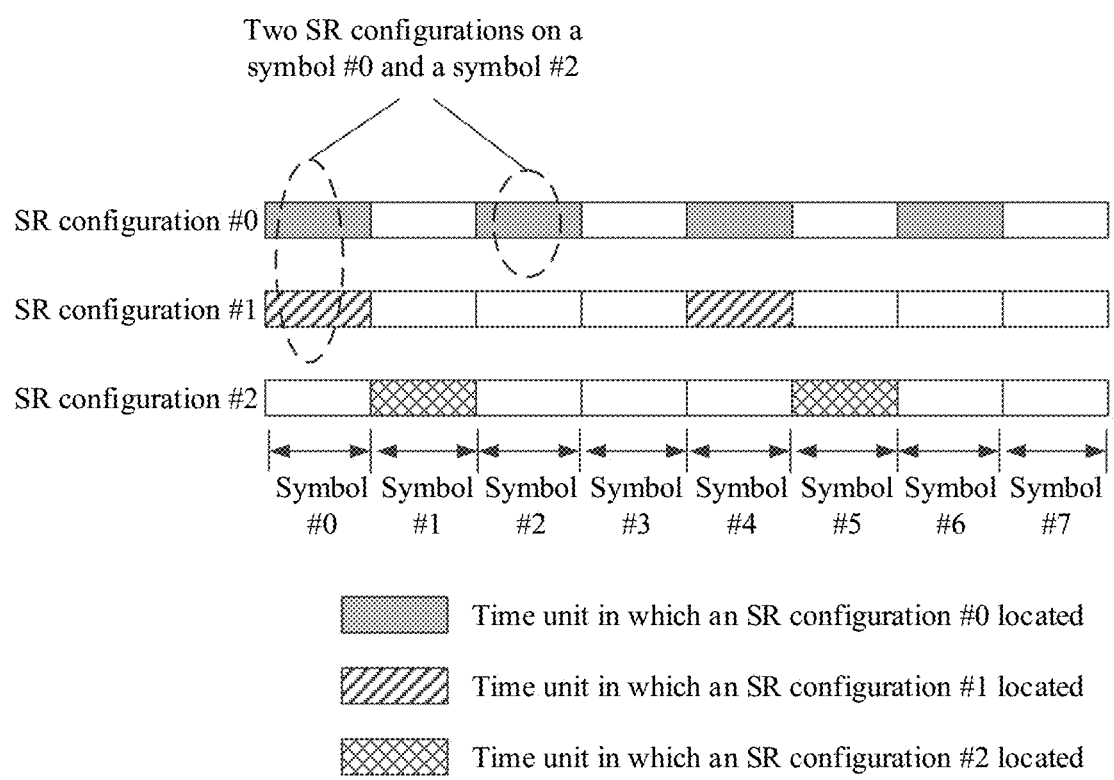
FIG. 11 is a schematic diagram of a plurality of SR configurations configured by a network device for a terminal device according to yet another embodiment of this application.

In the example shown in FIG. 10, the plurality of time units are consecutive. This application is not limited thereto, and the plurality of time units may alternatively be inconsecutive. For example, as shown in FIG. 11, SR configurations on a symbol #0 that are configured by the network device for the terminal device are: an SR configuration #0 and an SR configuration #1; and an SR configuration that is configured by the network device for the terminal device and that is on a symbol #2 is an SR configuration #0. In other words, total SR configurations that are configured by the network device for the terminal on the symbol #0 and the symbol #2 are: the SR configuration #0 and the SR configuration #1. A quantity of SR configurations that are configured by the network device for the terminal and that are on the symbol #0 and the symbol #2 is 2, and a first bit(s) is used to indicate an SR associated with at least one SR configuration in the SR configuration #0 and the SR configuration #1. The example is merely used to explain this application, and shall not be construed as any limitation.

In manner 3, SR configurations that are configured for the terminal and that are in a plurality of time units may include SR configurations associated with different uplink control channel attributes. For details about an uplink control channel attribute associated with an SR configuration, refer to description of a subsequent manner 4. Explanation is not given herein.

In manner 3, which is similar to manner 2, only SRs associated with SR configurations that are actually configured for the terminal and that are in a plurality of time units are reported, to reduce SR bit overheads.

(4) In manner 4, the quantity of the plurality of SR configurations is equal to a quantity of SR configurations that are associated with a same uplink control channel attribute and that are in one or more time units. To be specific, the plurality of SR configurations may be SR configurations that are dynamically configured by the network device for the terminal and that are in one or more time units and associated with a same uplink control channel attribute, or may be SR configurations that are configured by the network device for the terminal by using higher layer signaling and that are in one or more time units and associated with a same uplink control channel attribute, or may be SR configurations that are configured by another terminal for the terminal and that are in one or more time units and associated with a same uplink control channel attribute.

Herein, an uplink control channel attribute associated with an SR configuration is an attribute of an uplink control channel that carries an SR. An attribute of an uplink control channel may include at least one of the following: a length of a time unit occupied by the uplink control channel, or a quantity of time units occupied by the uplink control channel, or a format of the uplink control channel, or a minimum quantity or a maximum quantity of bits carried by the uplink control channel.

First, a single time unit (for example, one time unit is one symbol) is used as an example.

Figure 12:
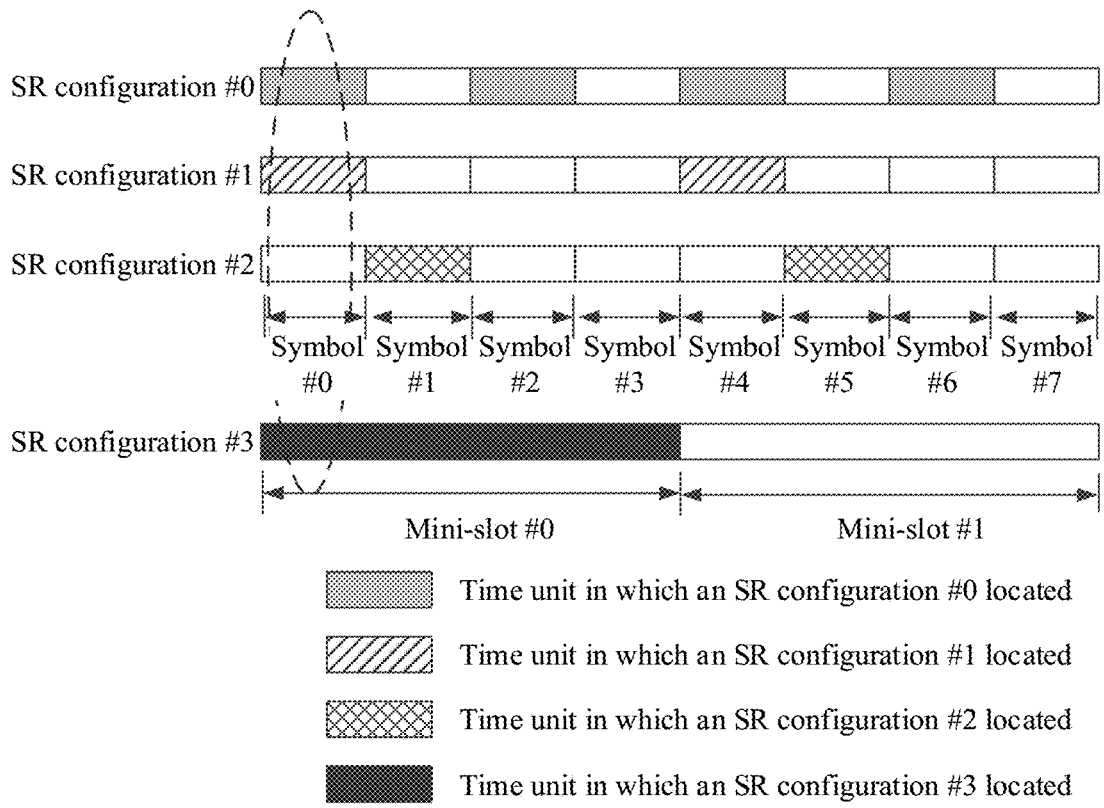
FIG. 12 is a schematic diagram of a plurality of SR configurations configured by a network device for a terminal device according to still yet another embodiment of this application.

For example, as shown in FIG. 12, SR configurations on a symbol #0 that are configured by the network device for the terminal device are: an SR configuration #0, an SR configuration #1, and an SR configuration #3. The SR configuration #0 and the SR configuration #1 are associated with a same uplink control channel attribute, and the same uplink control channel attribute is one symbol. In other words, a length of a time unit that carries an SR associated with the SR configuration #0 is one symbol, and a length of a time unit that carries an SR associated with the SR configuration #1 is also one symbol. An uplink control channel attribute associated with the SR configuration #3 is one mini-slot (namely, four symbols). In other words, a length of a time unit that carries an SR associated with the SR configuration #3 is four symbols or one mini-slot.

In the example shown in FIG. 12, from a perspective of the one-symbol uplink control channel attribute, SR configurations on the symbol #0 that are configured by the network device for the terminal device are the SR configuration #0 and the SR configuration #1, and do not include the SR configuration #3. In other words, a quantity of SR configurations that are configured by the network device for the terminal and that are on the symbol #0 and associated with the one-symbol uplink control channel attribute is 2, and in this case, a first bit(s) is used to indicate an SR(s) associated with at least one SR configuration in the SR configuration #0 and the SR configuration #1.

In the example shown in FIG. 12, from a perspective of the one-mini-slot uplink control channel attribute, an SR configuration that is configured by the network device for the terminal device and that is on the symbol #0 is the SR configuration #3, and does not include the SR configuration #0 or the SR configuration #1. In other words, a quantity of SR configurations on the symbol #0 that are configured by the network device for the terminal and that are associated with the one-mini-slot uplink control channel attribute is 1, and in this case, a first bit(s) is used to indicate an SR(s) associated with the SR configuration #3.

The foregoing example is merely used to explain this application, and shall not be construed as any limitation.

Second, a plurality of time units (for example, one time unit is one symbol) are used as an example.

For another example, as shown in FIG. 12, SR configurations that are configured by the network device for the terminal device and that are on a symbol #0 to a symbol #3 are: an SR configuration #0, an SR configuration #1, an SR configuration #2, and an SR configuration #3. The SR configuration #0, the SR configuration #1, and the SR configuration #2 are associated with a same uplink control channel attribute, and the same uplink control channel attribute is one symbol. An uplink control channel attribute associated with the SR configuration #3 is one mini-slot (namely, four symbols).

In the example shown in FIG. 12, from a perspective of the one-symbol uplink control channel attribute, SR configurations that are configured by the network device for the terminal device and that are on the symbol #0 to the symbol #3 are the SR configuration #0, the SR configuration #1, and the SR configuration #2, and do not include the SR configuration #3. In other words, a quantity of SR configurations that are configured by the network device for the terminal and that are on the symbol #0 to the symbol #3 and associated with the one-symbol uplink control channel attribute is 3, and in this case, a first bit(s) is used to indicate an SR associated with at least one SR configuration in the SR configuration #0, the SR configuration #1, and the SR configuration #2.

In the example shown in FIG. 12, from a perspective of the one-mini-slot uplink control channel attribute, an SR configuration that is configured by the network device for the terminal device and that is on the symbol #0 to the symbol #4 is the SR configuration #3, and does not include the SR configuration #0, the SR configuration #1, and the SR configuration #2. In other words, a quantity of SR configurations that are configured by the network device for the terminal and that are on the symbol #0 to the symbol #4 and associated with the one-mini-slot uplink control channel attribute is 1, and in this case, a first bit(s) is used to indicate an SR(s) associated with the SR configuration #3.

The foregoing example is merely used to explain this application, and shall not be construed as any limitation. In manner 4, the plurality of time units may be consecutive, or may be inconsecutive.

Manner 4 is described merely by using an example in which an uplink control channel attribute is a length of a time unit occupied by an uplink control channel. For another uplink control channel attribute, similar processing applies.

If a quantity of time units occupied by an uplink control channel is the same as a quantity of time units occupied by another uplink control channel, for example, both are two time units, it is considered that attributes of the uplink control channels are the same. Otherwise, the attributes are different.

If a format of an uplink control channel is the same as that of another uplink control channel, for example, both are uplink control channels in a first format, it is considered that attributes of the uplink control channels are the same. Otherwise, the attributes are different.

If a minimum quantity of bits that can be carried by an uplink control channel is the same as a minimum quantity of bits that can be carried by another uplink control channel, for example, both are two bits, it is considered that attributes of the uplink control channels are the same. Otherwise, the attributes are different.

If a maximum quantity of bits that can be carried by an uplink control channel is the same as a maximum quantity of bits that can be carried by another uplink control channel, for example, both are two bits, it is considered that attributes of the uplink control channels are the same. Otherwise, the attributes are different.

An operation manner applicable when the attributes are the same or different is similar to a manner for a length of a time unit occupied by an uplink control channel. In other words, a quantity of SR configurations is a quantity of SR configurations associated with a same attribute. Therefore, details are not described herein again.

In manner 4, SR configurations associated with different uplink control channel attributes can be reported distinctively, with higher flexibility.

Figure 13A:
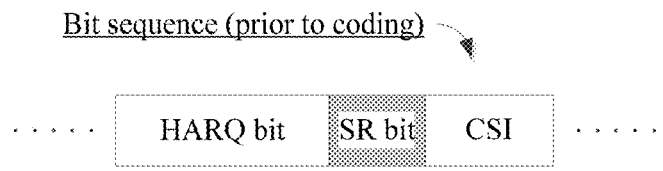
FIG. 13A to FIG. 13E are schematic diagrams of several location relationships between a HARQ bit(s) and an SR bit(s) according to this application.

In this application, a location relationship between an SR bit(s) and a HARQ bit(s) in a bit sequence may include but is not limited to the following:

(1) First location relationship: As shown in FIG. 13A, an SR bit(s) is adjacent to a HARQ bit(s), and the SR bit(s) is added after the HARQ bit(s).

Figure 13B:
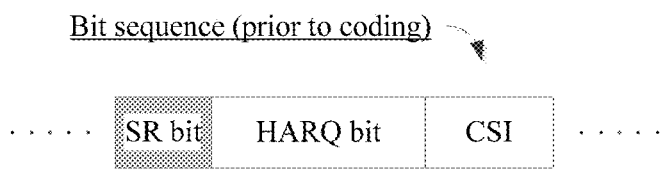

(2) Second location relationship: As shown in FIG. 13B, an SR bit(s) is adjacent to a HARQ bit(s), and the HARQ bit(s) is added after the SR bit(s). Because a capacity of an uplink control channel is limited, when a total amount of information to be transmitted is greater than a maximum capacity, information at the tail needs to be discarded, so that information arranged first can be protected. Therefore, when the SR bit(s) is more important, the SR bit(s) is arranged first, to protect the SR bit(s).

Figure 13C:
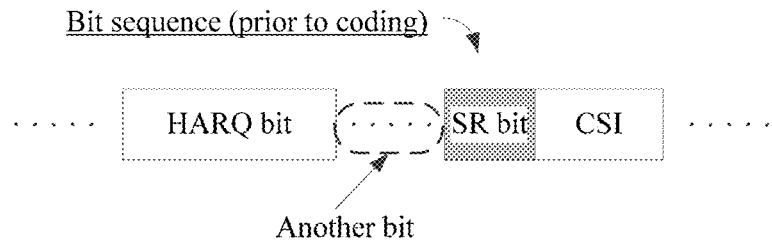

(3) Third location relationship: As shown in FIG. 13C, there is another bit between an SR bit(s) and a HARQ bit(s), and the SR bit(s) is added after the HARQ bit(s). When importance of some information is higher than importance of the SR bit(s) but lower than or equal to importance of the HARQ bit(s), the information may be arranged in this place. A beneficial effect of the arrangement is equivalent to (2), where important information is arranged first.

Figure 13D:
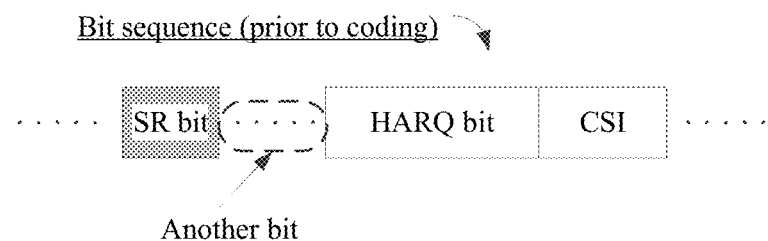

(4) Fourth location relationship: As shown in FIG. 13D, there is another bit between an SR bit(s) and a HARQ bit(s), and the HARQ bit(s) is added after the SR bit(s). When importance of some information is higher than importance of the HARQ bit(s) but lower than or equal to importance of the SR bit(s), the information may be arranged in this place. A beneficial effect of the arrangement is equivalent to (2), where important information is arranged first.

Figure 13E:
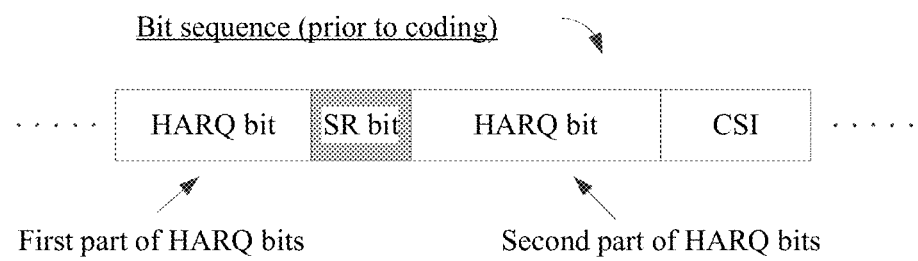

(5) Fifth location relationship: As shown in FIG. 13E, an SR bit(s) is added after a first part of HARQ bits, and a second part of HARQ bits are added after the SR bit(s). An advantage of this manner is as follows: When a frequency-domain resource occupied by an uplink control channel on which HARQ bits and SR bits are carried is allowed to change, for example, when the uplink control channel on a first symbol is on a first frequency-domain resource and the uplink control channel on a second symbol is on a second frequency-domain resource, some HARQ bits and some SR bits are placed on one of the frequency-domain resources, and the rest HARQ bits and rest SR bits are placed on the other frequency-domain resource, thereby improving accuracy in receiving partial information.

FIG. 13A to FIG. 13 E show only a concatenation relationship between an SR bit(s) and a HARQ bit(s) in an original bit sequence prior to coding. Herein, this application does not impose any particular limitation on other bits in (3) and (4), which may be any other bits prior to coding.

In this application, a time unit may be a symbol, a slot, a mini-slot, or a subframe. For definitions of these time units, refer to LTE standards. However, the definitions of these time units are not limited to the LTE standards. The definitions of these time units in a future communications standard may differ.

Figure 7:
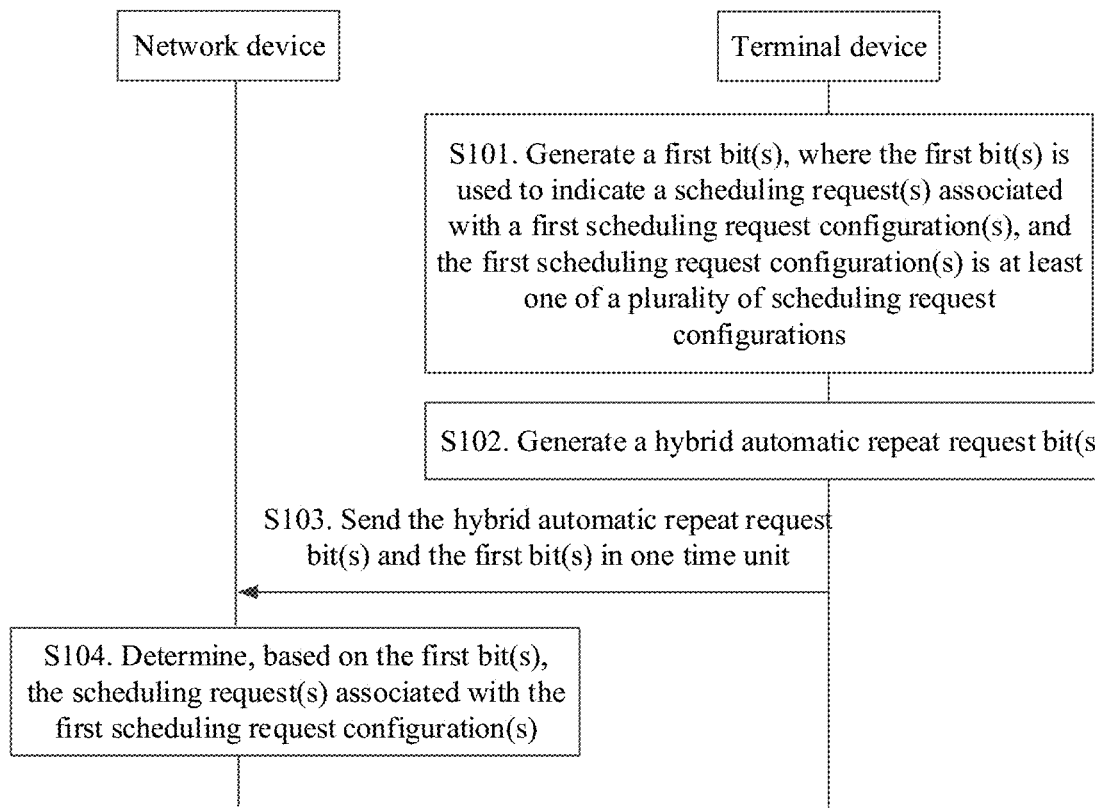
FIG. 7 is a schematic flowchart of a signal transmission method according to this application.

Based on the foregoing main invention principles, the following describes an overall procedure of a signal transmission method provided in this application. As shown in FIG. 7, the signal transmission method provided in this application may include the following steps.

S101. A terminal device generates a first bit(s). Herein, the first bit(s) is the foregoing SR bit(s), and may be used to indicate a scheduling request(s) associated with a first scheduling request configuration(s). The first scheduling request configuration(s) may be at least one of a plurality of scheduling request configurations configured by a network device for the terminal device.

Specifically, the generating, by a terminal device, a first bit(s) may include at least one of the following actions: (1) determining a quantity of first bit(s), and perform channel coding on the first bit(s); and (2) determining a bit state of the first bit(s), and determine the first bit(s) based on an attribute of a resource that needs to be requested.

The at least one scheduling request configuration in the plurality of scheduling request configurations may be dynamically configured by the network device, or configured by the network device by using higher layer signaling. Herein, the higher layer signaling may be media access control (MAC) layer signaling or radio resource control (RRC) layer signaling. The at least one scheduling request configuration may be at least one of a plurality of scheduling request configurations dynamically configured by the network device for the terminal device, or the at least one scheduling request configuration may be at least one of a plurality of scheduling request configurations configured by the network device for the terminal by using higher layer signaling.

For description of the at least one scheduling request configuration and the plurality of scheduling request configurations, refer to the foregoing section about the invention principles. Details are not described herein again.

S102. The terminal device generates a hybrid automatic repeat request bit(s). The hybrid automatic repeat request bit(s) is used to feed back a result of decoding one or more downlink data blocks by the terminal device, and the result may be a positive acknowledgment ACK or a negative acknowledgment ACK. The ACK indicates that the terminal has correctly performed the decoding. The NACK indicates that an error has occurred during the decoding by the terminal. It may be understood that, if the terminal feeds back a negative acknowledgment, the network device retransmits data for which an error has occurred during the decoding by the terminal.

Specifically, the generating, by the terminal device, a HARQ bit(s) may include at least one of the following actions: determining a quantity of HARQ bit(s), and performing channel coding on the HARQ bit(s); and determining a bit state of the HARQ bit(s), and determining the HARQ bit(s) based on a downlink data reception status.

S103. The terminal device sends the hybrid automatic repeat request bit(s) and the first bit(s) in one time unit. Correspondingly, the network device may receive the hybrid automatic repeat request bit(s) and the first bit(s) from the terminal device in the time unit.

S104. The network device may determine, based on the first bit(s), the scheduling request(s) associated with the first scheduling request configuration(s).

In an implementation, with reference to an SR bit(s) design solution provided in the subsequent Embodiment 1, the network device may determine, based on a state of each bit in the first bit(s), an SR (a positive SR or a negative SR) associated with an SR configuration corresponding to each bit.

For example, it is assumed that a possible state of each bit in the first bit(s) and a possible SR configuration corresponding to each bit are shown in Table 5. If the first bits actually transmitted are "0XXX", the network device may determine that the scheduling request associated with the first scheduling request configuration(s) is a negative SR associated with an SR configuration #0. If the first bits actually transmitted are "X1XX", the network device may determine that the scheduling request associated with the first scheduling request configuration is a positive SR associated with an SR configuration #1. The example is merely used to explain this application, and shall not be construed as any limitation.

In another implementation, with reference to an SR bit design solution provided in the subsequent Embodiment 1, the network device may determine, based on a state of a first bit(s), an SR (a positive SR or a negative SR) corresponding to the state.

For example, it is assumed that a possible state of each bit in the first bit(s) and a possible SR configuration corresponding to each bit are shown in Table 6-1. If first bits actually transmitted are "001", the network device may determine that the scheduling request associated with the first scheduling request configuration(s) is a positive SR associated with an SR configuration #0. If the first bits actually transmitted are "000", the network device may determine that the scheduling request associated with the first scheduling request configuration(s) is: negative SRs associated with SR configurations #0, #1, #2, and #3, in other words, SRs associated with all the SR configurations are negative SRs.

Not limited to a case shown in FIG. 7, there may be another time sequence of S101 and S102. For example, S102 is performed before S101. This is not limited in this application.

The following describes, in detail with reference to a plurality of embodiments, how to design the SR bit(s).

(1) Embodiment 1

In this embodiment, one bit in the SR bit(s) (namely, the first bit(s)) is used to indicate a scheduling request(s) associated with one SR configuration in the at least one SR configuration (namely, first SR configuration(s)). It may be understood that a first SR configuration(s) corresponds to a bit(s) in the SR bit(s). Specifically, one SR configuration corresponds to one bit in the SR bit(s). In this case, a quantity $O^{SR}$ of the SR bits is equal to a quantity of the plurality of SR configurations (namely, the plurality of SR configurations mentioned in the foregoing invention principles) configured for the terminal. This is a manner in which the quantity $O^{SR}$ of the SR bits is related to the quantity of the plurality of SR configurations. For a definition of the quantity of the plurality of SR configurations mentioned in the foregoing invention principles, refer to the foregoing section about the invention principles. Details are not described herein again.

One bit in the SR bit(s) is used to indicate whether an SR associated with one SR configuration in the first SR configuration(s) is a positive SR or a negative SR. Specifically, one bit in the SR bit(s) is used to indicate whether an SR associated with one SR configuration corresponding to the bit is a positive SR or a negative SR. For example, it is assumed that one bit in the SR bit(s) corresponds to an SR configuration #0. Table 4 shows the bit and an indication meaning of the bit.

TABLE 4

| Bit state | Indication meaning of a bit (a corresponding SR configuration, and an SR associated with the SR configuration) |
|---|---|
| 0 | Negative SR associated with an SR configuration #0 |
| 1 | Positive SR associated with an SR configuration #0 |

The left column in Table 4 represents a state ("0" or "1") of the bit, and the right column in Table 4 represents an SR indicated by the bit. When the state of the bit is "0", it indicates that the SR indicated by the bit is a negative SR associated with the SR configuration #0; or when the state of the bit is "1", it indicates that the SR indicated by the bit is a positive SR associated with the SR configuration #0. Table 4 is merely intended to explain this application. In practical application, a correspondence between the state of the bit and the SR indicated by the bit may be contrary to that shown in Table 4, and this is not limited herein.

The following describes Embodiment 1 in detail by using an example in which there are four SR bits ($O^{SR}$=4).

It is assumed that the four SR bits respectively correspond to four different SR configurations: an SR configuration #3, an SR configuration #2, an SR configuration #1, and an SR configuration #0.

Figure 14A:
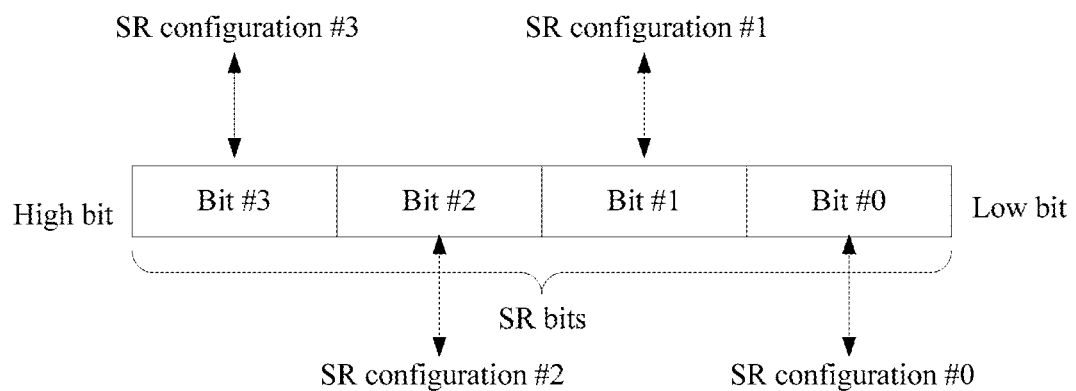
FIG. 14A and FIG. 14B are schematic diagrams of two correspondences between an SR bit and an SR configuration according to this application.

Optionally, as shown in FIG. 14A, the four SR bits may respectively correspond, in an order from a most significant bit to a least significant bit, to an SR configuration #3, an SR configuration #2, an SR configuration #1, and an SR configuration #0. Optionally, as shown in FIG. 14B, the four SR bits may respectively correspond, in an order from a least significant bit to a most significant bit, to an SR configuration #3, an SR configuration #2, an SR configuration #1, and an SR configuration #0.

Figure 14B:
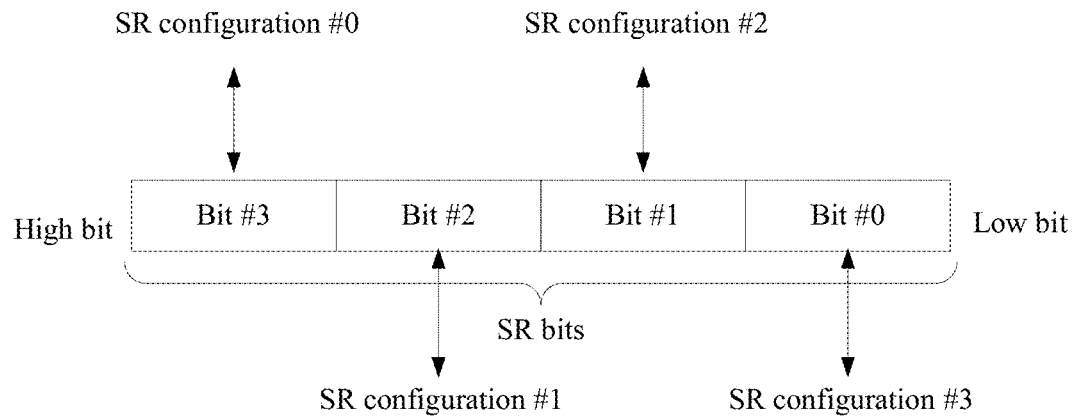

Not limited to the manners shown in FIG. 14A and FIG. 14B, the four SR bits may correspond to four different SR configurations in another manner, and this is not limited herein.

Specifically, a correspondence similar to a correspondence that is shown in FIG. 14A or FIG. 14B and that is between an SR configuration and a bit in the SR bits may be dynamically configured by a network device, or may be configured by a network device by using higher layer signaling. The correspondence may include B SR configurations, and B bits respectively corresponding to the B SR configurations. In this way, a terminal device may determine, based on the correspondence, each bit corresponding to each SR configuration of the at least one SR configuration (namely, first SR configuration(s)) in the SR bits. Herein, B is a positive integer. In this application, the correspondence configured by the network device or configured by using higher layer signaling may be referred to as a first correspondence.

It is assumed that the correspondence shown in FIG. 14A is used as for the four SR bits and the four SR configurations. Table 5 shows an example of an indication meaning of each bit in the SR bits.

TABLE 5

| State | Indication meaning of bits |
|---|---|
| 0XXX | Negative SR associated with an SR configuration #0 |
| 1XXX | Positive SR associated with an SR configuration #0 |
| X0XX | Negative SR associated with an SR configuration #1 |
| X1XX | Positive SR associated with an SR configuration #1 |
| XX0X | Negative SR associated with an SR configuration #2 |
| XX1X | Positive SR associated with an SR configuration #2 |
| XXX0 | Negative SR associated with an SR configuration #3 |
| XXX1 | Positive SR associated with an SR configuration #3 |

In Table 5, row 1 and row 2 represent the first most significant bit of the SR bits and a meaning of the bit. When a state of the bit is "0", it indicates that an SR indicated by the bit is a negative SR associated with an SR configuration #0, in other words, an SR associated with an SR configuration #0 reported by a terminal is a negative scheduling request; or when a state of the bit is "1", it indicates that an SR indicated by the bit is a positive SR associated with an SR configuration #0, in other words, an SR associated with an SR configuration #0 reported by a terminal is a positive scheduling request. In this case, "X" in row 1 and row 2 means that, whether a state of any other bit is 0 or 1 does not affect a correspondence between the first bit and the SR configuration #0, and does not affect indication, by the first bit, of whether the SR associated with the SR configuration #0 is a positive SR or a negative SR. Similarly, every two rows of the rest rows in Table 5 represent a bit in the SR bits and an indication meaning of the bit, and details are not described herein again.

In the example shown in Table 5, if a bit state of the SR bits is "0011", it indicates that indicated SRs are: a negative SR associated with an SR configuration #0, a negative SR associated with an SR configuration #1, a positive SR associated with an SR configuration #2, and a positive SR associated with an SR configuration #3. In other words, the terminal device actually reports two positive SRs: a positive SR associated with an SR configuration #2, and a positive SR associated with an SR configuration #3. Similarly, when values of a plurality of other bits in the SR bits are "1", it indicates that the terminal device actually reports positive SRs associated with a plurality of other SR configurations. In particular, when the bit state of the SR bits is "1111", it indicates that the SR bits allow the terminal device to simultaneously report positive SRs associated with a maximum of four different SR configurations.

This application is not limited to that one SR configuration corresponds to one bit in the SR bits. In Embodiment 1, one SR configuration may alternatively correspond to a plurality of bits in the SR bits. In other words, a plurality of bits may be used to indicate an SR associated with one SR configuration. In this case, a quantity $O^{SR}$ of the SR bits is equal to an integer multiple of a quantity of SR configurations (namely, the plurality of SR configurations mentioned in the foregoing invention principles) configured by the network device for the terminal. This is another manner in which the quantity $O^{SR}$ of the SR bits is related to the quantity of the SR configurations configured by the network device for the terminal. For a definition of the quantity of the plurality of SR configurations mentioned in the foregoing invention principles, refer to the foregoing section about the invention principles. Details are not described herein again.

For example, in the example shown in Table 5, two most significant bits of the SR bits are used to indicate an SR associated with an SR configuration #0. When a state of the two bits is "00", it indicates that the SR indicated by the two bits is a negative SR associated with the SR configuration #0; or when a state of the two bits is a non-zero state ("01", or "10", or "11"), it indicates that the SR indicated by the two bits is a positive SR associated with the SR configuration #0. The example is merely an implementation provided in this application and shall not be construed as any limitation, and the implementation may vary in practical application. In this way, a plurality of non-zero states may be used to indicate a plurality of available attributes (for example, a TTI) of an uplink control channel that carries an SR, so as to instruct the network device to select one attribute from the plurality of attributes, thereby adapting to a scenario of a plurality of uplink control channel attributes in SR management.

It can be learned from the foregoing description that, in the SR bit design solution provided in Embodiment 1, a plurality of SRs can be reported, and SRs associated with a plurality of different SR configurations can be flexibly reported.

(2) Embodiment 2

In this embodiment, a bit state of an SR bit(s) (namely, a first bit(s)) is used to indicate a scheduling request(s) associated with the at least one SR configuration (namely, first SR configuration(s)). The SR (positive SR or negative SR) associated with the first SR configuration(s) corresponds to the state of the SR bit(s).

Optionally, a first state of the SR bit(s) is used to indicate that the SR(s) associated with the first SR configuration(s) is a negative SR(s).

Optionally, at least one state of the SR bit(s) other than the first state is used to indicate that the SR(s) associated with the first SR configuration(s) is a positive SR(s).

Optionally, no state of the SR bit(s) other than the first state is used to indicate that any one of the SR(s) associated with the first SR configuration(s) is a negative SR.

Specifically, in a plurality of states of the SR bits, only one state (for example, a zero state) corresponds to a negative SR associated with the first SR configuration(s). In other words, the only one state is used to indicate that the SRs associated with the first SR configuration(s) are all negative SRs. It may be understood that, at least one state other than the only state is not used to indicate that any one of the SRs associated with the first SR configuration(s) is a negative SR. The at least one state other than the only one state corresponds to a positive SR(s) associated with at least one SR configuration in the first SR configuration(s). In other words, the at least one state other than the only one state is used to indicate a positive SR(s) associated with at least one SR configuration. In this application, the only state may be referred to as a first state.

It is assumed that the SR bits have three bits, and states of the three bits are used to indicate SRs associated with four different SR configurations. Table 6-1 and Table 6-2 show examples of an indication meaning of each state of the SR bits.

TABLE 6-1

| Bit state | Indication meaning of bits |
|---|---|
| 000 | Negative SRs associated with SR configurations #0, #1, #2, and #3 |
| 001 | Positive SR associated with an SR configuration #0 |
| 010 | Positive SR associated with an SR configuration #1 |
| 011 | Positive SR associated with an SR configuration #2 |
| 100 | Positive SR associated with an SR configuration #3 |
| 101 | Reserved |
| 110 | Reserved |
| 111 | Reserved |

TABLE 6-2

| Bit state | Indication meaning of bits |
|---|---|
| 000 | Negative SRs associated with SR configurations #0, #1, #2, and #3 |
| 001 | Positive SR associated with an SR configuration #0 |
| 010 | Positive SR associated with an SR configuration #1 |
| 011 | Positive SR associated with an SR configuration #2 |
| 100 | Positive SR associated with an SR configuration #3 |
| 101 | Positive SRs associated with an SR configuration #0 and an SR configuration #1 |
| 110 | Positive SRs associated with an SR configuration #2 and an SR configuration #3 |
| 111 | Positive SRs associated with SR configurations #0, #1, #2, and #3 |

When the state of the SR bits is "000", it indicates that SRs associated with SR configurations #0, #1, #2, and #3 are all negative SRs. In other states of the SR bits, at least one state represents a positive SR associated with at least one SR configuration. For details, refer to Table 6-1 and Table 6-2.

It can be learned from the foregoing description that, in the SR bit design solution provided in Embodiment 2, an amount of information carried by an uplink control channel may be reduced by indicating, by using a relatively small quantity of bits, each SR associated with the at least one SR configuration (namely, first SR configuration(s)), thereby improving a transmission success rate of the uplink control channel.

Specifically, a correspondence similar to a correspondence that is shown in Table 6-1 or Table 6-2 and that is between an SR and a state of the SR bits may be dynamically configured by a network device, or may be configured by a network device by using higher layer signaling. The correspondence may include SRs associated with P SR configurations, and Q states corresponding to the SRs associated with the P SR configurations. In this way, a terminal may determine, based on the correspondence, a state corresponding to an SR associated with the at least one SR configuration (namely, first SR configuration(s)). Herein, Q≥3, Q is a positive integer, P≥2, and P is a positive integer. In this application, the correspondence may be referred to as a second correspondence.

In Embodiment 2, a quantity $O^{SR}$ of the SR bits may be: $O^{SR}=\mathrm{ceil}(\log_2(1+N_{configuration}))$, where $N_{configuration}$ represents a quantity of SR configurations (namely, the plurality of SR configurations mentioned in the foregoing invention principles) configured for the terminal, and ceil represents rounding up to a next integer. This is another manner in which the quantity $O^{SR}$ of the SR bits is related to the quantity of the SR configurations configured by the network device for the terminal. For a definition of the quantity of the plurality of SR configurations mentioned in the foregoing invention principles, refer to the foregoing section about the invention principles. Details are not described herein again.

In Embodiment 2, a state of the SR bits may alternatively be used to indicate SRs associated with a plurality of SR configurations.

For example, a state "101" in Table 6-2 is used to indicate a positive SR associated with an SR configuration #0 and a positive SR associated with an SR configuration #1. In other words, when the SR bits are "101", the terminal device reports a positive SR associated with an SR configuration #0 and a positive SR associated with an SR configuration #1. In this case, it may be understood that this is equivalent to reporting of a negative SR associated with an SR configuration #2 and a negative SR associated with an SR configuration #3. Similarly, a state "110" in Table 6-2 may be used to indicate a positive SR associated with an SR configuration #3 and a positive SR associated with an SR configuration #2; and a state "111" in Table 6-2 may be used to indicate a positive SR associated with an SR configuration #3, a positive SR associated with an SR configuration #2, a positive SR associated with an SR configuration #1, and a positive SR associated with an SR configuration #0. The example is merely used to explain this application, and shall not be construed as any limitation.

Optionally, an index of an SR configuration associated with one positive SR may be used as a maximum value, and SRs associated with SR configurations whose indices are less than the maximum value are all positive SRs. In this way, the terminal device can indicate, based on only a state of an SR bit corresponding to this positive SR, positive SRs associated with a plurality of SR configurations.

For example, it is assumed that a state of the SR bits is "100", used to indicate a positive SR associated with an SR configuration #3. In this case, the index "3" of the SR configuration #3 is used as a maximum value, and SRs respectively associated with an SR configuration #2, an SR configuration #1, and an SR configuration #0 whose indices are less than "3" are all positive SRs. The example is merely used to explain this application, and shall not be construed as any limitation.

Optionally, an index of an SR configuration associated with one positive SR may be used as a minimum value, and SRs associated with SR configurations whose indices are greater than the minimum value are all positive SRs. In this way, the terminal device can indicate, based on only a state of an SR bit corresponding to the positive SR, positive SRs associated with a plurality of SR configurations.

For example, it is assumed that a state of the SR bits is "001", used to indicate a positive SR associated with an SR configuration #1. In this case, the index "1" of the SR configuration #1 is used as a minimum value, and SRs respectively associated with an SR configuration #2 and an SR configuration #3 whose indices are greater than "1" are all positive SRs. The example is merely used to explain this application, and shall not be construed as any limitation.

With reference to Embodiment 1 or Embodiment 2, in some optional implementations, a quantity of HARQ bits sent along with the SR bit(s) is greater than or equal to X, X≥2, and X is a positive integer. This prevents affecting a transmission success rate for a small quantity of HARQ bits. This is because reliability of HARQ transmission design increases as the quantity of HARQ bits increases. In other words, when the quantity of HARQ bits is relatively small, it is not suitable to add a plurality of SR bits after a HARQ bit.

With reference to Embodiment 1 or Embodiment 2, in some optional implementations, a length of a current time unit is greater than or equal to Y symbols, Y≥1, and Y is a positive integer. This prevents affecting a transmission success rate of an uplink control channel in a time unit of a short length. This is because transmit power of an uplink control channel in a current time unit increases as a time length of a current time-domain resource increases, bringing higher reliability. In other words, when the time length of the current time unit is relatively small, it is not suitable for the uplink control channel in the current time unit to carry a plurality of SR bits.

Figure 15:
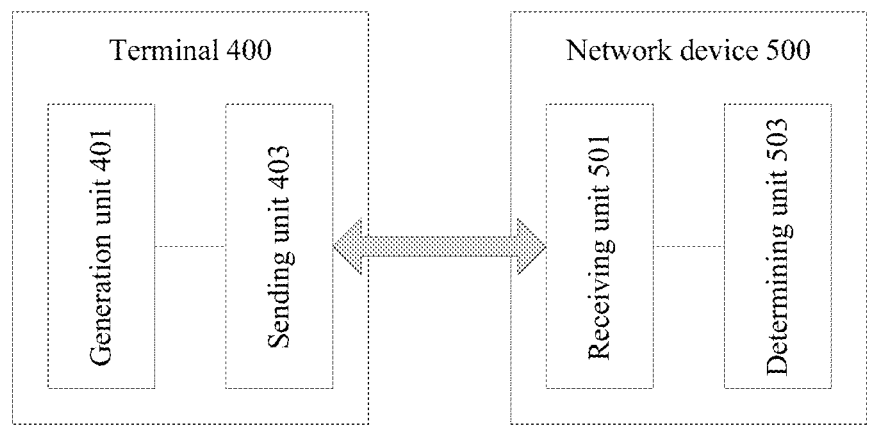
FIG. 15 is a function block diagram of a wireless communications system, a terminal device, and a network device according to this application.

FIG. 15 shows a wireless communications system, a terminal, and a network device according to this application. The wireless communications system 10 includes: a terminal 400 and a network device 500. The terminal 400 may be the terminal 200 in the embodiment in FIG. 4, the network device 500 may be the network device 300 in the embodiment in FIG. 5, and the wireless communications system 10 may be the wireless communications system 100 described in FIG. 3, as separately described below.

As shown in FIG. 15, the terminal 400 may include: a generation unit 401 and a sending unit 403.

The generation unit 401 may be configured to generate a first bit(s). The first bit(s) may be used to indicate a scheduling request(s) associated with a first scheduling request configuration(s), and the first scheduling request configuration(s) may be at least one of a plurality of scheduling request configurations.

The generation unit 401 may be further configured to generate a hybrid automatic repeat request bit(s).

The sending unit 403 may be configured to send the hybrid automatic repeat request bit(s) and the first bit(s) in one time unit.

In this application, a quantity of the plurality of scheduling request configurations may be equal to a quantity of scheduling request configurations in the time unit, or a quantity of the plurality of scheduling request configurations may be equal to a quantity of all scheduling request configurations.

Specifically, the first bit(s) may indicate, in the following manners, the scheduling request(s) associated with the first scheduling request configuration(s):

In a first manner, one bit in the first bit(s) may be used to indicate a scheduling request(s) associated with one scheduling request configuration in first scheduling request configuration(s).

For details about the first manner, refer to Embodiment 1. Details are not described herein again.

In a second manner, a first state of the first bit(s) may be used to indicate that the scheduling request(s) associated with the first scheduling request configuration(s) is a negative scheduling request(s), at least one state of the first bit(s) other than the first state may be used to indicate that the scheduling request(s) associated with the first scheduling request configuration(s) is a positive scheduling request(s), and no state of the first bit(s) other than the first state is used to indicate that any one of the scheduling request(s) associated with the first scheduling request configuration(s) is a negative scheduling request.

For details about the second manner, refer to Embodiment 2. Details are not described herein again.

Specifically, a quantity of the first bit(s) may be related to the quantity of the plurality of scheduling request configurations, specifically in the following manners:

In a correlation manner, when the design solution in Embodiment 1 is used for the SR bits, a quantity $O^{SR}$ of the SR bits may be equal to the quantity of the plurality of scheduling request configurations.

In another correlation manner, when the design solution in Embodiment 2 is used for the SR bits, a quantity $O^{SR}$ of the SR bits may be: $O^{SR}=\text{ceil}(\log_2(1+N_{configuration}))$, where $N_{configuration}$ represents a quantity of SR configurations (namely, the plurality of SR configurations mentioned in the foregoing invention principles) configured for the terminal, and ceil represents rounding up to a next integer.

Technical advantages of the correlation between the quantity of the first bit(s) and the quantity of the plurality of scheduling request configurations are as follows: In such a predefinition manner, the network device and the terminal device can determine the quantity of the first bit(s) before the first bit(s) is sent, so that the network device and the terminal device do not have different understandings of the quantity of the first bit(s), thereby avoiding a case in which the first bit(s) fails to be received due to the different understandings.

In some optional implementations, a quantity of HARQ bits sent along with the SR bit(s) is greater than or equal to X, X≥2, and X is a positive integer. This prevents affecting a transmission success rate for a small quantity of HARQ bits. This is because reliability of HARQ transmission design increases as the quantity of HARQ bits increases. In other words, when the quantity of HARQ bits is relatively small, it is not suitable to add a plurality of SR bits after a HARQ bit.

In some optional implementations, a length of the time unit is greater than or equal to Y symbols, Y≥1, and Y is a positive integer. This prevents affecting a transmission success rate of an uplink control channel in a time unit of a short length. This is because transmit power of an uplink control channel in a current time unit increases as a time length of a current time-domain resource increases, bringing higher reliability. In other words, when the time length of the current time unit is relatively small, it is not suitable for the uplink control channel in the current time unit to carry a plurality of SR bits.

It may be understood that, for specific implementation of each functional unit included in the terminal 400, refer to the foregoing embodiments. Details are not described herein again.

As shown in FIG. 15, the network device 500 may include: a receiving unit 501 and a determining unit 503.

The receiving unit 501 may be configured to receive, in one time unit, a hybrid automatic repeat request bit(s) and a first bit(s) that are sent by a terminal device. The first bit(s) may be used to indicate a scheduling request(s) associated with a first scheduling request configuration(s), and the first scheduling request configuration(s) may be at least one of a plurality of scheduling request configurations.

The determining unit 503 may be configured to determine, based on the first bit(s), the scheduling request(s) associated with the first scheduling request configuration(s).

In this application, a quantity of the plurality of scheduling request configurations may be equal to a quantity of scheduling request configurations in the time unit, or a quantity of the plurality of scheduling request configurations may be equal to a quantity of all scheduling request configurations.

Specifically, the first bit(s) may indicate, in the following manners, the scheduling requests associated with the first scheduling request configuration(s):

In a first manner, one bit in the first bit(s) may be used to indicate a scheduling request(s) associated with one scheduling request configuration in first scheduling request configuration(s). In this way, the determining unit 503 may be configured to determine, based on a state of each bit in the first bit(s), an SR (a positive SR or a negative SR) associated with an SR configuration corresponding to each bit.

For details about the first manner, refer to Embodiment 1. Details are not described herein again.

In a second manner, a first state of the first bit(s) may be used to indicate that the scheduling request(s) associated with the first scheduling request configuration(s) is a negative scheduling request(s), at least one state of the first bit(s) other than the first state may be used to indicate that the scheduling request(s) associated with the first scheduling request configuration(s) is a positive scheduling request(s), and no state of the first bit(s) other than the first state is used to indicate that any one of the scheduling request(s) associated with the first scheduling request configuration(s) is a negative scheduling request. In this way, the determining unit 503 may be configured to determine, based on a state of the first bit(s), an SR (a positive SR or a negative SR) corresponding to the state.

For details about the second manner, refer to Embodiment 2. Details are not described herein again.

Specifically, a quantity of the first bit(s) may be related to the quantity of the plurality of scheduling request configurations, specifically in the following manners:

In a correlation manner, when the design solution in Embodiment 1 is used for the SR bits, a quantity $O^{SR}$ of the SR bits may be equal to the quantity of the plurality of SR configurations.

In another correlation manner, when the design solution in Embodiment 2 is used for the SR bits, a quantity $O^{SR}$ of the SR bits may be: $O^{SR}=\text{ceil}(\log_2(1+N_{configuration}))$, where $N_{configuration}$ represents a quantity of SR configurations (namely, the plurality of SR configurations mentioned in the foregoing invention principles) configured for the terminal, and ceil represents rounding up to a next integer.

In some optional implementations, a quantity of HARQ bits sent along with the SR bit(s) is greater than or equal to X, X≥2, and X is a positive integer. This prevents affecting a transmission success rate for a small quantity of HARQ bits. This is because reliability of HARQ transmission design increases as the quantity of HARQ bits increases. In other words, when the quantity of HARQ bits is relatively small, it is not suitable to add a plurality of SR bits after a HARQ bit.

In some optional implementations, a length of the time unit is greater than or equal to Y symbols, Y≥1, and Y is a positive integer. This prevents affecting a transmission success rate of an uplink control channel in a time unit of a short length. This is because transmit power of an uplink control channel in a current time unit increases as a time length of a current time-domain resource increases, bringing higher reliability. In other words, when the time length of the current time unit is relatively small, it is not suitable for the uplink control channel in the current time unit to carry a plurality of SR bits.

It may be understood that, for specific implementation of each functional unit included in the network device 500, refer to the foregoing embodiments. Details are not described herein again.

Figure 16:
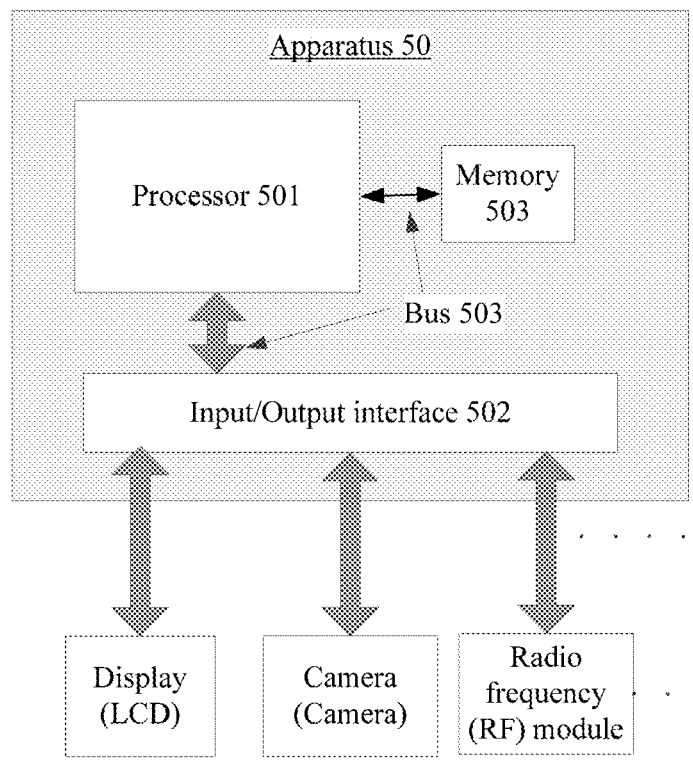
FIG. 16 is a schematic structural diagram of an apparatus according to this application.

FIG. 16 is a schematic structural diagram of an apparatus according to this application. As shown in FIG. 16, the apparatus 50 may include: a processor 501, and one or more interfaces 502 coupled to the processor 501. Optionally, the apparatus 50 may further include a memory 503. Optionally, the apparatus 50 may be a chip.

The processor 501 may be configured to read and execute a computer readable instruction. In specific implementation, the processor 501 may mainly include a controller, an arithmetic unit, and a register. The controller is mainly responsible for decoding an instruction, and sending a control signal for an operation that corresponds to the instruction. The arithmetic unit is mainly responsible for performing a fixed-point or floating-point arithmetic operation, a shift operation, a logic operation, and the like; and may also perform address calculation and conversion. The register is mainly responsible for storing a register operand and an intermediate operation result to be temporarily stored in a process of executing an instruction, and the like. In specific implementation, a hardware architecture of the processor 501 may be an application-specific integrated circuit (ASIC) architecture, a MIPS architecture, an ARM architecture, an NP architecture, or the like. The processor 501 may be a single-core processor, or may be a multi-core processor.

The memory 503 may be configured to store program code including a computer-accessible instruction, and may be further configured to store input/output data of the processor 501.

The input/output interface 502 may be configured to input to-be-processed data to the processor 501, and may output a processing result of the processor 501. In specific implementation, the interface 502 may be a general purpose input/output (GPIO) interface, and may be connected to a plurality of peripheral devices (for example, a display (LCD), a camera, and a radio frequency module). The interface 502 may further include a plurality of independent interfaces, for example, an Ethernet interface, an LCD interface, and a camera interface, which are respectively responsible for communication between different peripheral devices and the processor 501.

In this application, the processor 501 may be configured to invoke, from the memory, a program for implementing, on a terminal side, a signal transmission method provided in one or more embodiments of this application, and execute an instruction included in the program. The interface 502 may be configured to output an execution result of the processor 501. In this application, the interface 502 may be specifically configured to output a processing result of the processor 501. Specifically, the processor 501 may be configured to generate a first bit(s) and a hybrid automatic repeat request bit(s), and the interface 502 may be configured to output the first bit(s) and the hybrid automatic repeat request bit(s). For description related to the first bit(s), refer to the foregoing embodiments. Details are not described herein again. For the signal transmission method provided in one or more embodiments of this application, refer to the foregoing embodiments. Details are not described herein again.

It should be noted that, functions respectively corresponding to the processor 501 and the interface 502 may be implemented by using hardware design, or may be implemented by using software design, or may be implemented by combining software and hardware, and this is not limited herein.

Figure 17:
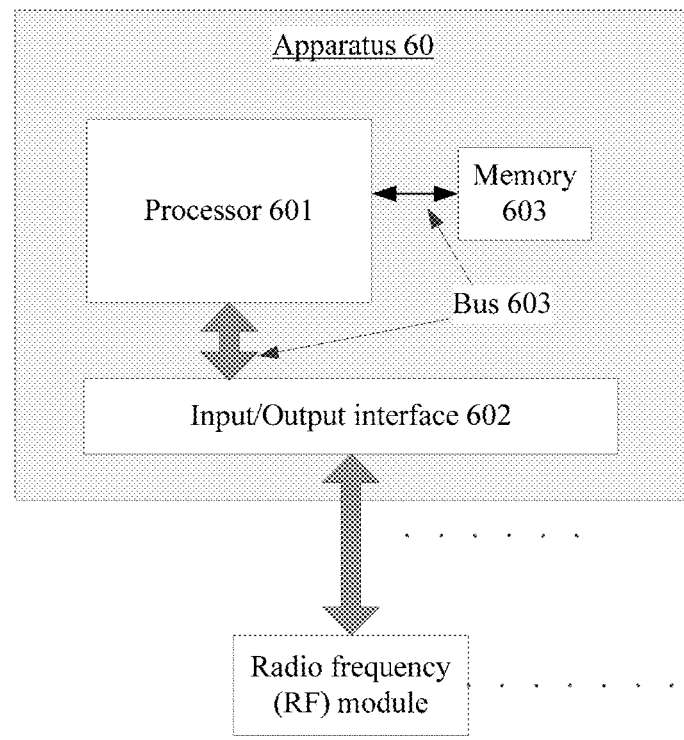
FIG. 17 is a schematic structural diagram of another apparatus according to this application.

FIG. 17 is a schematic structural diagram of an apparatus according to this application. As shown in FIG. 17, the apparatus 60 may include: a processor 601, and one or more interfaces 601 coupled to the processor 602. Optionally, the apparatus 60 may further include a memory 603. Optionally, the apparatus 60 may be a chip.

The processor 601 may be configured to read and execute a computer readable instruction. In specific implementation, the processor 601 may mainly include a controller, an arithmetic unit, and a register. The controller is mainly responsible for decoding the instruction, and sending a control signal for an operation that corresponds to the instruction. The arithmetic unit is mainly responsible for performing a fixed-point or floating-point arithmetic operation, a shift operation, a logic operation, and the like; and may also perform address calculation and conversion. The register is mainly responsible for storing a register operand and an intermediate operation result to be temporarily stored in a process of executing the instruction, and the like. In a specific implementation, a hardware architecture of the processor 601 may be an application-specific integrated circuit (ASIC) architecture, or the like. The processor 601 may be a single-core processor, or may be a multi-core processor.

The memory 603 may be configured to store program code including a computer-accessible instruction, and may be further configured to store input/output data of the processor 601.

The input/output interface 602 may be configured to input data to be processed to the processor 601, and may output a processing result of the processor 601.

In this application, the processor 601 may be configured to: invoke, from the memory, a program for implementing, on a network device side, a signal transmission method provided in one or more embodiments of this application, and execute an instruction included in the program. The interface 602 may be configured to output an execution result of the processor 601. Specifically, the processor 601 may be configured to determine, based on a first bit(s) from a terminal device, a scheduling request(s) associated with a first scheduling request configuration(s), and the interface 602 may be configured to output the scheduling request(s) that is determined by the processor 601 and that is associated with the first scheduling request configuration(s). For description related to the first bit(s), the first scheduling request configuration(s), and the like, refer to the foregoing embodiments. Details are not described herein again. For the signal transmission method provided in one or more embodiments of this application, refer to the foregoing embodiments. Details are not described herein again.

It should be noted that, functions respectively corresponding to the processor 601 and the interface 602 may be implemented by using hardware design, or may be implemented by using software design, or may be implemented by combining software and hardware, and this is not limited herein.

In summary, a plurality of scheduling request configurations can be supported by implementing the foregoing solutions provided in this application, so as to adapt to a multi-service scenario in a future communications system.

A person of ordinary skill in the art may understand that all or some of the processes of the methods in the foregoing embodiments may be implemented by a computer program instructing related hardware. The program may be stored in a computer readable storage medium. When the program runs, the processes of the methods in the foregoing embodiments are performed. The foregoing storage medium includes: any medium that can store program code, such as a ROM, a random access memory RAM, a magnetic disk, or an optical disc.

What is claimed is:

1. A signal transmission method, comprising:
generating, by an apparatus, a first bit sequence, wherein a quantity of bits of the first bit sequence is equal to ceil($\log_2$(1+N)), ceil represents an operation of rounding up to a next integer, N is a quantity of a plurality of scheduling request (SR) configurations, N≥2, a value of the first bit sequence belongs to a set, and the set comprises 1+N values,
wherein a first value in the 1+N values indicates that each of a plurality of SRs is a negative SR, each remaining value in the 1+N values indicates a positive SR, and a second value in the 1+N values indicates a first SR is a positive SR,
wherein the first SR is one SR of the plurality of SRs, the first SR of the plurality of SRs is associated with a first SR configuration, and the first SR configuration is one of the plurality of SR configurations;
generating, by the apparatus, a hybrid automatic repeat request (HARQ) bit sequence; and
sending, by the apparatus, a second bit sequence through an uplink control channel, wherein the second bit sequence comprises the HARQ bit sequence and the first bit sequence.

2. The method according to claim 1, wherein the second bit sequence further comprises a channel state information (CSI) bit sequence, and
wherein the CSI bit sequence is appended at an end of the first bit sequence, and the first bit sequence is appended at an end of the HARQ bit sequence.

3. The method according to claim 1, wherein the first value is an all-zero value for all bits of the first bit sequence.

4. The method according to claim 3, wherein the second value of the first bit sequence is '001', a third value of the first bit sequence is '010', a fourth value of the first bit sequence is '011', and a fifth value of the first bit sequence is '100',
wherein the third value indicates a second SR associated with a second SR configuration is a positive SR, the fourth value indicates a third SR associated with a third SR configuration is a positive SR, the fifth value indicates a fourth SR associated with a fourth SR configuration is a positive SR, and the second SR configuration, the third SR configuration and the fourth SR configuration are three SR configurations of the plurality of SR configurations, and
wherein index numbers of the first SR configuration, the second SR configuration, the third SR configuration and the fourth SR configuration are in ascending order.

5. A communication apparatus, comprising:
a processor, configured to:
generate a first bit sequence, wherein a quantity of bits of the first bit sequence is equal to ceil($\log_2$(1+N)), ceil represents an operation of rounding up to a next integer, N is a quantity of a plurality of scheduling request (SR) configurations, N≥2, a value of the first bit sequence belongs to a set, and the set comprises 1+N values,
wherein a first value in the 1+N values indicates that each of a plurality of SRs is a negative SR, each remaining value in the 1+N values indicates a positive SR, and a second value in the 1+N values indicates a first SR is a positive SR,
wherein the first SR is one SR of the plurality of SRs, the first SR of the plurality of SRs is associated with a first SR configuration, and the first SR configuration is one of the plurality of SR configurations, wherein a quantity of bits of the first bit sequence is equal to ceil($\log_2$(1+N)); and
generate a hybrid automatic repeat request (HARQ) bit sequence; and
a transceiver, configured to send a second bit sequence through an uplink control channel, wherein the second bit sequence comprises the HARQ bit sequence and the first bit sequence.

6. The communication apparatus according to claim 5, wherein the second bit sequence further comprises a channel state information (CSI) bit sequence, and wherein the CSI bit sequence is appended at an end of the first bit sequence, and the first bit sequence is appended at an end of the HARQ bit sequence.

7. The communication apparatus according to claim 5, wherein the first value is an all-zero value for all bits of the first bit sequence.

8. The communication apparatus according to claim 7, wherein the second value of the first bit sequence is '001', a third value of the first bit sequence is '010', a fourth value of the first bit sequence is '011', and a fifth value of the first bit sequence is '100',
wherein the third value indicates a second SR associated with a second SR configuration is a positive SR, the fourth value indicates a third SR associated with a third SR configuration is a positive SR, the fifth value indicates a fourth SR associated with a fourth SR configuration is a positive SR, and the second SR configuration, the third SR configuration and the fourth SR configuration are three SR configurations of the plurality of SR configurations, and
wherein index numbers of the first SR configuration, the second SR configuration, the third SR configuration and the fourth SR configuration are in ascending order.

9. A communication apparatus, comprising:
a transceiver, configured to receive a second bit sequence through an uplink control channel, wherein the second bit sequence comprises a hybrid automatic repeat request (HARQ) bit sequence and a first bit sequence, wherein a quantity of bits of the first bit sequence is equal to ceil($\log_2(1+N)$), ceil represents an operation of rounding up to a next integer, N is a quantity of a plurality of scheduling request (SR) configurations, N≥2, a value of the first bit sequence belongs to a set, and the set comprises 1+N values,
wherein a first value in the 1+N values indicates that each of a plurality of SRs is a negative SR, each remaining value in the 1+N values indicates a positive SR, and a second value in the 1+N values indicates a first SR is a positive SR,
wherein the first SR is one SR of the plurality of SRs, the first SR of the plurality of SRs is associated with the first SR configuration, and the first SR configuration is one of a plurality of SR configurations; and
a processor, configured to determine, based on the first bit sequence, that the first SR is the positive SR or that each of the plurality of SRs is a negative SR.

10. The communication apparatus according to claim 9, wherein the second bit sequence further comprises a channel state information (CSI) bit sequence, and
wherein the CSI bit sequence is appended at an end of the first bit sequence, and the first bit sequence is appended at an end of the HARQ bit sequence.

11. The communication apparatus according to claim 9, wherein the first value is an all-zero value for all bits of the first bit sequence.

12. The communication apparatus according to claim 11, wherein the second value of the first bit sequence is '001', a third value of the first bit sequence is '010', a fourth value of the first bit sequence is '011', and a fifth value of the first bit sequence is '100', wherein the third value indicates a second SR associated with a second SR configuration is a positive SR, the fourth value indicates a third SR associated with a third SR configuration is a positive SR, the fifth value indicates a fourth SR associated with a fourth SR configuration is a positive SR, and the second SR configuration, the third SR configuration and the fourth SR configuration are three SR configurations of the plurality of SR configurations, and
wherein index numbers of the first SR configuration, the second SR configuration, the third SR configuration and the fourth SR configuration are in ascending order.

* * * * *